(12) United States Patent
Goring et al.

(10) Patent No.: US 7,698,383 B2
(45) Date of Patent: Apr. 13, 2010

(54) SYSTEM AND METHOD FOR BUILDING COMPONENT APPLICATIONS USING METADATA DEFINED MAPPING BETWEEN MESSAGE AND DATA DOMAINS

(75) Inventors: Bryan R. Goring, Milton (CA); Michael Shenfield, Richmond Hill (CA); Kamen B. Vitanov, Toronto (CA); Viera Bibr, Kilbride (CA)

(73) Assignee: Research In Motion Limited, Waterloo (CA)

( * ) Notice: Subject to any disclaimer, the term of this patent is extended or adjusted under 35 U.S.C. 154(b) by 1322 days.

(21) Appl. No.: 10/787,929

(22) Filed: Feb. 27, 2004

(65) Prior Publication Data
US 2005/0198100 A1 Sep. 8, 2005

(51) Int. Cl.
G06F 15/16 (2006.01)
G06F 15/177 (2006.01)
G06F 9/44 (2006.01)
G06F 9/46 (2006.01)
G06F 9/445 (2006.01)
G06F 15/173 (2006.01)
G06F 3/00 (2006.01)
G06F 13/00 (2006.01)
G06F 7/00 (2006.01)
G06F 17/00 (2006.01)
G06F 17/30 (2006.01)

(52) U.S. Cl. .................. 709/219; 709/203; 709/221; 709/236; 719/316; 719/332; 717/175; 717/178

(58) Field of Classification Search .............. 709/203, 709/219, 221, 226, 236; 719/315, 316, 332; 717/174–178; 707/6, 10, 104.1
See application file for complete search history.

(56) References Cited

U.S. PATENT DOCUMENTS
6,539,422 B1 * 3/2003 Hunt et al. .................. 709/217
(Continued)

FOREIGN PATENT DOCUMENTS
EP 1569109 A1 * 8/2005
(Continued)

OTHER PUBLICATIONS
Baker, M. and Stark, P. "The 'application/xhtml+xml' Media Type," RFC 3236, Jan. 2002, pp. 1-8.*
(Continued)

Primary Examiner—Rupal D Dharia
Assistant Examiner—Melvin H Pollack
(74) Attorney, Agent, or Firm—Gowling Lafleur Henderson LLP

(57) ABSTRACT

It is desirable to drive down the complexity involved in developing the wireless application by reducing the need to do any explicit coding, as well as reducing device resources utilized by the application when provisioned. Having an intelligent wireless device runtime environment (Device Runtime) that provides a set of basic services to manage the wireless application as a series if application components, and their interactions, can simplify the development effort and reduce resource allocation. The wireless application is described as a set of components. The data domain for this category of applications is defined using atomic data components. The communication between the device and a server is defined using atomic message components. Both message and data components are described in metadata using a structured definition language such as XML. The relationships between the message and data components are embedded in the XML definitions in the form of message/data mappings. Typically, outgoing messages are derived from some underlying data component and incoming messages affect the current state (or data representation) of the application. It is therefore apparent that the metadata defined mapping relationship is preferable between the expression of data and message components.

35 Claims, 12 Drawing Sheets

U.S. PATENT DOCUMENTS

| | | | | |
|---|---|---|---|---|
| 6,772,216 | B1* | 8/2004 | Ankireddipally et al. | 709/230 |
| 6,904,593 | B1* | 6/2005 | Fong et al. | 717/171 |
| 6,990,513 | B2* | 1/2006 | Belfiore et al. | 709/203 |
| 7,069,335 | B1* | 6/2006 | Layman et al. | 709/238 |
| 7,089,232 | B2* | 8/2006 | Dettinger et al. | 707/3 |
| 7,089,588 | B2* | 8/2006 | Schaefer et al. | 726/22 |
| 7,096,229 | B2* | 8/2006 | Dettinger et al. | 707/102 |
| 7,117,267 | B2* | 10/2006 | Bavadekar | 709/230 |
| 7,127,705 | B2* | 10/2006 | Christfort et al. | 717/113 |
| 7,130,885 | B2* | 10/2006 | Chandra et al. | 709/206 |
| 7,137,099 | B2* | 11/2006 | Knight et al. | 717/100 |
| 7,139,761 | B2* | 11/2006 | McKibben et al. | 707/10 |
| 7,143,101 | B2* | 11/2006 | Oliver et al. | 707/101 |
| 7,155,490 | B1* | 12/2006 | Malmer et al. | 709/217 |
| 7,185,317 | B2* | 2/2007 | Fish et al. | 717/121 |
| 7,194,503 | B2* | 3/2007 | Shell et al. | 709/202 |
| 7,194,692 | B2* | 3/2007 | Marcos et al. | 715/744 |
| 7,200,681 | B1* | 4/2007 | Lewin et al. | 709/246 |
| 7,209,921 | B2* | 4/2007 | Pace et al. | 707/10 |
| 7,269,788 | B2* | 9/2007 | Gharavy | 715/234 |
| 7,275,105 | B2* | 9/2007 | Bloch et al. | 709/227 |
| 7,299,274 | B2* | 11/2007 | Rajarajan et al. | 709/223 |
| 7,304,984 | B2* | 12/2007 | Butler et al. | 370/352 |
| 7,305,671 | B2* | 12/2007 | Davidov et al. | 717/172 |
| 7,308,642 | B2* | 12/2007 | Rapakko et al. | 715/203 |
| 7,313,782 | B2* | 12/2007 | Lurie et al. | 717/104 |
| 7,315,868 | B1* | 1/2008 | Turba | 707/104.1 |
| 7,317,912 | B2* | 1/2008 | Pakarinen et al. | 455/418 |
| 7,318,063 | B2* | 1/2008 | Brychell et al. | 707/100 |
| 7,346,893 | B2* | 3/2008 | Deimel et al. | 717/121 |
| 7,349,761 | B1* | 3/2008 | Cruse | 700/276 |
| 7,349,871 | B2* | 3/2008 | Labrou et al. | 705/26 |
| 7,360,202 | B1* | 4/2008 | Seshadri et al. | 717/106 |
| 7,380,237 | B2* | 5/2008 | Goring et al. | 717/115 |
| 7,392,391 | B2* | 6/2008 | Eibach et al. | 713/175 |
| 7,395,540 | B2* | 7/2008 | Rogers | 719/310 |
| 7,403,788 | B2* | 7/2008 | Trioano et al. | 455/466 |
| 7,404,188 | B2* | 7/2008 | Luty et al. | 719/315 |
| 7,409,674 | B2* | 8/2008 | Shenfield et al. | 717/114 |
| 7,451,403 | B1* | 11/2008 | Srinivasan et al. | 715/763 |
| 7,458,082 | B1* | 11/2008 | Slaughter et al. | 719/328 |
| 7,483,923 | B2* | 1/2009 | Novik | 707/201 |
| 7,536,696 | B2* | 5/2009 | Snover et al. | 719/313 |
| 7,548,946 | B1* | 6/2009 | Saulpaugh et al. | 709/203 |
| 7,590,643 | B2* | 9/2009 | Demiroski et al. | 707/101 |
| 2002/0116205 | A1* | 8/2002 | Ankireddipally et al. | 705/1 |
| 2002/0133535 | A1* | 9/2002 | Lucovsky et al. | 709/201 |
| 2003/0004930 | A1* | 1/2003 | Minder et al. | 707/2 |
| 2003/0005412 | A1* | 1/2003 | Eanes | 717/120 |
| 2003/0051037 | A1* | 3/2003 | Sundaram et al. | 709/227 |
| 2003/0093433 | A1* | 5/2003 | Seaman et al. | 707/102 |
| 2003/0181196 | A1* | 9/2003 | Davidov et al. | 455/414.1 |
| 2003/0237049 | A1* | 12/2003 | Sawicki et al. | 715/513 |
| 2004/0015822 | A1* | 1/2004 | Linton et al. | 717/104 |
| 2004/0068568 | A1* | 4/2004 | Griffin et al. | 709/227 |
| 2004/0123242 | A1* | 6/2004 | McKibben et al. | 715/513 |
| 2004/0249846 | A1* | 12/2004 | Randall et al. | 707/102 |
| 2005/0165826 | A1* | 7/2005 | Ho et al. | 707/102 |
| 2005/0193380 | A1* | 9/2005 | Vitanov et al. | 717/143 |
| 2005/0193382 | A1* | 9/2005 | Goring et al. | 717/162 |
| 2008/0313282 | A1* | 12/2008 | Warila et al. | 709/206 |

FOREIGN PATENT DOCUMENTS

| | | | |
|---|---|---|---|
| EP | 1845446 | A2* | 10/2007 |
| TW | 561352 | | 11/2003 |
| TW | 565782 | | 12/2003 |
| TW | 591536 | | 6/2004 |
| WO | WO 98/30962 | | 7/1998 |
| WO | WO 03/044654 | | 5/2003 |

OTHER PUBLICATIONS

Abrams, Marc et al. "UML: An Appliance-Independent XML User Interface Language," Computer Networks, 1999, pp. 1-18.*

Saha, S. et al. "Bringing the Wireless Internet to Mobile Devices," Computer, vol. 34, Issue 6, Jun. 2001, pp. 54-58.*

Read, K. and Maurer, F. "Developing Mobile Wireless Applications," IEEE Internet Computing, vol. 7, Issue 1, Jan./Feb. 2003, pp. 81-86.*

McFadden, Fred R. et al. "Modern Database Management, Fifth Edition," Addison-Wesley, May 1999, Chapters 3 and 6, pp. 85-118, 207-244.*

Grundy J et al: "Generating EDI message translations from visual specifications" Automated Software Engineering, 2001. (ASE 2001). Proceedings. 16th Annual International Conference on Nov. 26-29, 2001. Piscataway, NJ, USA, IEEE, Nov. 26, 2001, pp. 35-42, XP010583488 ISBN: 0-7695-1426-X *p. 37, right-hand column, line 12—p. 39, right-hand column, line 21 * *figures 2-5 *.

International Business Machines Corporation: "Message definition language" Research Disclosure Kenneth Mason Publications, Hapshire, GB, vol. 440, No. 166, Dec. 2000, XP007127351 ISSN: 0374-4353 * the whole document *.

European Search Report, dated Apr. 27, 2005.

Office Action issued by the Australian Intellectual Property Office dated Apr. 10, 2007 for corresponding Australian Patent Application No. 2005200849.

Office Action issued by the Canadian Intellectual Property Office dated Aug. 19, 2008 for corresponding Canadian Patent Application No. 2,498,539.

Office Action issued by the State Intellectual Property Office of People's Republic of China dated May 8, 2009 for corresponding Chinese Patent Application No. 200510052451.0.

Examination Report issued by the European Patent Office dated Dec. 4, 2006 for corresponding European Patent Application No. 04251155.0.

Examination Report issued by the European Patent Office dated Jul. 2, 2008 for corresponding European Patent Application No. 04251155.0.

Office Action issued by the Indian Patent Office dated Oct. 26, 2007 for corresponding Indian Patent Application No. 410/Del/2005 with Examiner's markings.

Office Action issued by the Japanese Patent Office dated Feb. 20, 2007 for corresponding Japanese Patent Application No. 2005-053699.

Office Action issued by the Japanese Patent Office dated Oct. 25, 2007 for corresponding Japanese Patent Application No. 2005-053699.

Decision of Refusal and Decision to Dismiss Notice dated May 22, 2009 for corresponding Japanese Patent Application No. 2005-053699.

Office Action issued by the Korean Patent Office dated Oct. 4, 2006 for corresponding Korean Patent Application No. 10-2005-0016468.

Office Action issued by the Mexican Patent Office dated Apr. 1, 2009 for corresponding Mexican Patent Application No. PA/a/2005/002273.

Office Action issued by the Taiwan Intellectual Property Office dated Aug. 23, 2007 for corresponding Taiwan Patent Application No. 94105897.

* cited by examiner

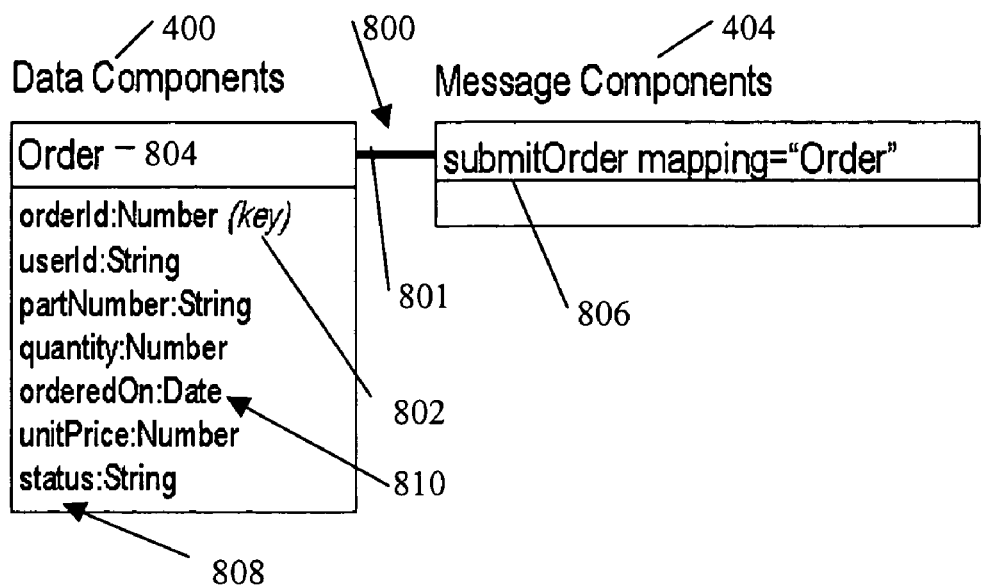

Figure 8a

```
  400                                          802
    \                                          /
   <wcData name="Order" pkey="orderId">
      <dfield name="orderId" type="Number"/>
812 ↘ <dfield name="userId" type="String"/>
      <dfield name="specialName" type="String"/>
      <dfield name="confirmationId" type="Number"/>
      <dfield name="deliveryTime" type="Date"/>
      <dfield name="status" type="String"/>
   </wcData>
   <wcMsg name="submitOrder" mapping="Order"/>
     \404
```

Figure 8b

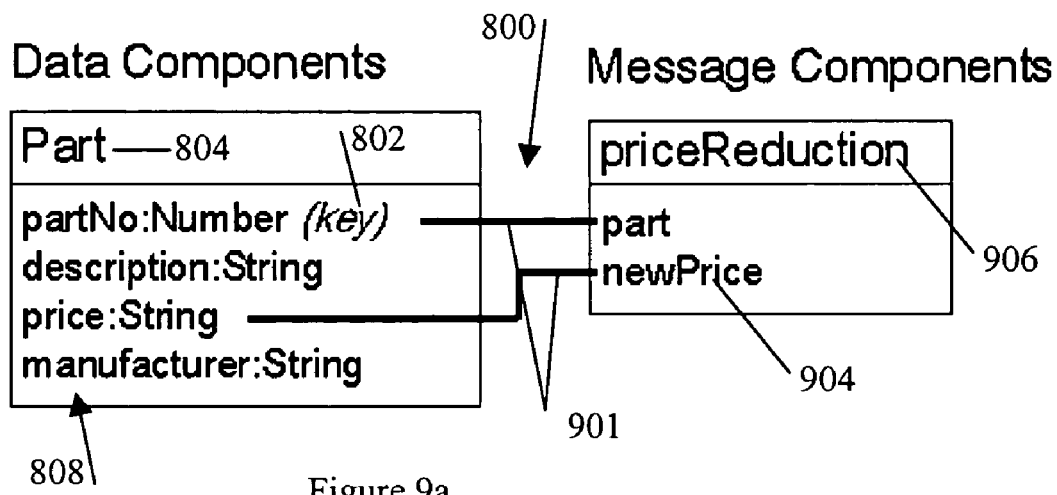

Figure 9a

```
                 400                            802
<wcData name="Part" pkey="partNo">
    <dfield name="partNo" type="Number"/>
808 <dfield name="description" type="String"/>
    <dfield name="price" type="String"/>
    <dfield name="manufacturer" type="String"/>
</wcData>
                                              901
<wcMsg name="priceReduction">
    <dfield name="part" mapping="Part.partNo"/>
    <dfield name="newPrice" mapping="Part.price"/>
</wcMsg>                     904                        901
    404
```

Figure 9b

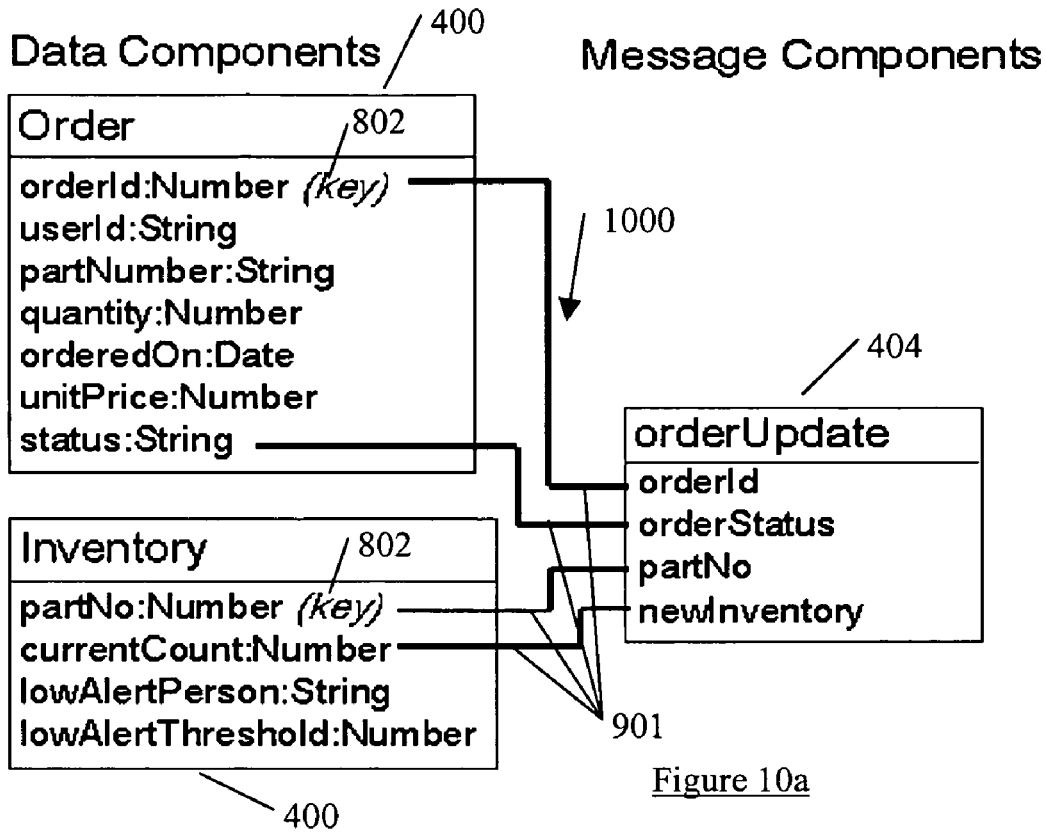

Figure 10a

```
                                                     802
<wcData name="Order" pkey="orderId">
    <dfield name="orderId" type="Number"/>
    <dfield name="userId" type="String"/>
    <dfield name="specialName" type="String"/>
    <dfield name="confirmationId" type="Number"/>
    <dfield name="deliveryTime" type="Date"/>
    <dfield name="status" type="String"/>
</wcData>
<wcData name="Inventory" pkey="partNo">    802
    <dfield name="partNo" type="Number"/>
    <dfield name="currentCount" type="Number"/>
    <dfield name="lowAlertPerson" type="String"/>
    <dfield name="lowAlertThreshold" type="Number"/>
</wcData>
<wcMsg name="orderUpdate">                          901
    <dfield name="orderId" mapping="Order.orderId"/>
    <dfield name="orderStatus" mapping="Order.status"/>
    <dfield name="partNo" mapping="Inventory.partNo"/>
    <dfield name="newInventory" mapping="Inventory.currentCount"/>
</wcMsg>
```

Figure 10b

SYSTEM AND METHOD FOR BUILDING COMPONENT APPLICATIONS USING METADATA DEFINED MAPPING BETWEEN MESSAGE AND DATA DOMAINS

BACKGROUND OF THE INVENTION

This application relates generally to communication of services over a network to a device.

There is a continually increasing number of terminal devices in use today, such as mobile telephones, PDAs with wireless communication capabilities, personal computers, self service kiosks and two-way pagers. Software applications which run on these devices increase their utility. For example, a mobile phone may include an application which retrieves the weather for a range of cities, or a PDA may include an application that allows a user to shop for groceries. These software applications take advantage of the connectivity to a network in order to provide timely and useful services to users. However, due to the restricted resources of some devices, and the complexity of delivering large amounts of data to the devices, developing software applications for a variety of devices remains a difficult and time-consuming task.

Currently, devices are configured to communicate with Web Services through Internet based Browsers and/or native applications. Browsers have the advantage of being adaptable to operate on a cross-platform basis for a variety of different devices, but have a disadvantage of requesting pages (screen definitions in HTML) from the Web Service, which hinders the persistence of data contained in the screens. A further disadvantage of Browsers is that the screens are rendered at runtime, which can be resource intensive. Native applications have the advantage of being developed specifically for the type of device platform, thereby providing a relatively optimized application program for each runtime environment. However, native applications have disadvantages of not being platform independent, thereby necessitating the development of multiple versions of the same application, as well as being relatively large in size, thereby taxing the memory resources of the device. Further, application developers need experience with programming languages such as Java and C++ to construct these hard coded native applications. There is a need for application programs that can be run on client devices having a wide variety of runtime environments, as well as having a reduced consumption of device resources.

The systems and methods disclosed herein provide a component based application environment to obviate or mitigate at least some of the above presented disadvantages.

SUMMARY OF THE INVENTION

It is desirable to drive down the complexity involved in developing the wireless application by reducing the need to do any explicit coding, as well as reducing device resources utilized by the application when provisioned. Having an intelligent wireless device runtime environment (Device Runtime) that provides a set of basic services to manage the wireless application as a series if application components, and their interactions, can simplify the development effort and reduce resource allocation. The wireless application is described as a set of components. The data domain for this category of applications is defined using atomic data components. The communication between the device and a server is defined using atomic message components. Both message and data components are described in metadata using a structured definition language such as XML. The relationships between the message and data components are embedded in the XML definitions in the form of message/data mappings. Typically, outgoing messages are derived from some underlying data component and incoming messages affect the current state (or data representation) of the application. It is therefore apparent that the metadata defined mapping relationship is preferable between the expression of data and message components.

According to the present invention there is provided a method for generating a communication message instance based on a data instance for interaction with an application executed on a device, the application including a data component having at least one data field definition and a message component having at least one message field definition, the component definitions expressed in a structured definition language, the method comprising the steps of: selecting the message component corresponding to the message instance; identifying at least one unique mapping present in the message component, the mapping for specifying a relationship between the message component and the data component as defined by a unique identifier representing the mapping; selecting the data component mapped by the mapping according to the unique mapping identifier; obtaining a data instance field value corresponding to the data field definition of the mapped data component; generating a message field value of the message instance to include the data instance field value according to the format of the data field definition as defined in the mapped data component.

According to a further aspect of the present invention there is provided a method for generating a data instance based on a message instance corresponding to an application executed on a device, the application including a data component having at least one data field definition and a message component having at least one message field definition, the component definitions expressed in a structured definition language, the method comprising the steps of: selecting the message component corresponding to the message instance; identifying at least one unique mapping present in the message component, the mapping for specifying a relationship between the message component and the data component as defined by a unique identifier representing the mapping; selecting the data component mapped by the mapping according to the unique mapping identifier; obtaining a message instance field value from the message instance corresponding to the mapped data component; assigning the message instance field value to a data field value of the data instance according to the format of the data field definition as defined in the mapped data component.

According to a still further aspect of the present invention there is provided a method for generating a communication message instance based on a data instance for interaction with an application executed on a device, the application including a data component and a message component having at least one message field definition and at least one data field definition, the component definitions expressed in a structured definition language, the method comprising the steps of: selecting the data component corresponding to the data instance; identifying a unique mapping present in the data component, the mapping for specifying a relationship between the message component and the data component as defined by a unique identifier representing the mapping; selecting the message component mapped by the mapping according to the unique mapping identifier; obtaining a data instance field value corresponding to the message field definition of the mapped message component; generating a message field value of the message instance to include the data instance field value according to the format of the data field definition as defined in the mapped message component.

According to a further aspect of the present invention there is provided a method for generating a data instance based on a message instance corresponding to an application executed on a device, the application including a data component and a message component having at least one message field definition and at least one data field definition, the component definitions expressed in a structured definition language, the method comprising the steps of: selecting the message component corresponding to the message instance; identifying a unique mapping present in the data component, the mapping for specifying a relationship between the message component and the data component as defined by a unique identifier representing the mapping; selecting the message component mapped by the mapping according to the unique mapping identifier; obtaining a message instance field value from the message instance corresponding to the data field definition of the mapped message component; assigning the message instance field value to a data field value of the data instance according to the format of the data field definition as defined in the mapped message component.

According to a further aspect of the present invention there is provided a device for generating a communication message instance based on a data instance for interaction with an application executed on the device, the application including a data component having at least one data field definition and a message component having at least one message field definition, the component definitions expressed in a structured definition language, the method comprising the steps of: means for selecting the message component corresponding to the message instance; means for identifying at least one unique mapping present in the message component, the mapping for specifying a relationship between the message component and the data component as defined by a unique identifier representing the mapping; means for selecting the data component mapped by the mapping according to the unique mapping identifier; means for obtaining a data instance field value corresponding to the data field definition of the mapped data component; means for generating a message field value of the message instance to include the data instance field value according to the format of the data field definition as defined in the mapped data component.

BRIEF DESCRIPTION OF THE DRAWINGS

These and other features will become more apparent in the following detailed description in which reference is made to the appended drawings by way of example only, wherein:

FIGS. 8a and 8b are examples of a message level mapping for the application of FIG. 4;

FIGS. 9a and 9b are examples of a field level mapping for the application of FIG. 4;

FIGS. 10a and 10b are examples of a complex mapping for the application of FIG. 4;

DESCRIPTION OF THE PREFERRED EMBODIMENTS

Network System

Figure 1:
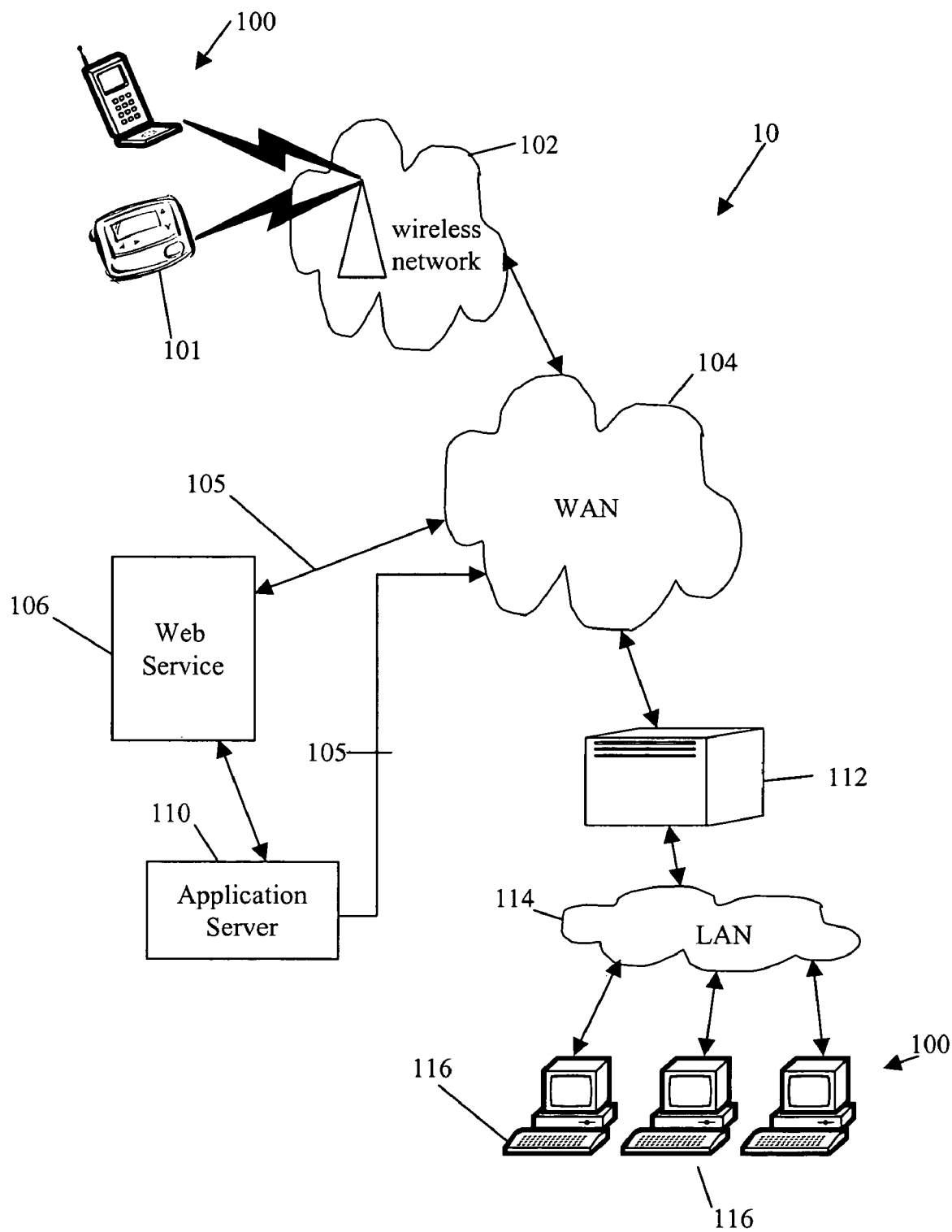
FIG. 1 is a block diagram of a network system.

Referring to FIG. 1, a network system 10 comprises a plurality of generic terminal devices 100 for interacting with one or more generic schema defined services 106, via a coupled Wide Area Network (WAN) 104 such as but not limited to the Internet. These generic terminal devices 100 can be such as but not limited to personal computers 116, wireless devices 101, PDAs, self-service kiosks and the like. The generic services provided by the service 106 can be Web Services and/or other services such as but not limited to SQL Databases, IDL-based CORBA and RMI/IIOP systems, Legacy Databases, J2EE, SAP RFCs, and COM/DCOM components. Further, the system 10 can also have a gateway server 112 for connecting the desktop terminals 116 via a Local Area Network (LAN) 114 to the service 106. Further, the system 10 can also have a wireless network 102 for connecting the wireless devices 101 to the WAN 104. It is recognized that other devices and computers (not shown) could be connected to the web service 106 via the WAN 104 and associated networks other than as shown in FIG. 1. The generic terminal devices 100, wireless devices 101 and personal computers 116 are hereafter referred to as the devices 100 for the sake of simplicity. Web services 106 are selected for the following description of the system 10, for the sake of simplicity. However, it is recognized that other services could be substituted for the web services 106, if desired. Further, the networks 102, 104, 112 of the system 10 will hereafter be referred to as the network 104, for the sake of simplicity.

Referring again to FIG. 1, the devices 100 transmit and receive requests/response messages 105, respectively, when in communication with the web services 106. The devices 100 can operate as web clients of the web services 106 by using the requests/response messages 105 in the form of message header information and associated data content, for example requesting and receiving product pricing and availability from an on-line merchant. The web service 106 is an example of a system with which client application programs 302 (see FIG. 2) on the communication devices 100 interact via the wireless network 104 in order to provide utility to users of the communication devices 100.

For satisfying the appropriate requests/response messages 105, the web service 106 can communicate with an application server 110 through various protocols (such as but not limited to HTTP and component API) for exposing relevant business logic (methods) to client application programs 302 (see FIG. 2) once provisioned on the devices 100. The application server 110 can also contain the web service 106 software, such that the web service 106 can be considered a subset of the application server 110. The application programs 302 of the device 100 can use the business logic of the application server 110 similarly to calling a method on an object (or a function). It is recognized that the client application program 302 can be downloaded/uploaded in relation to the application server 110, through the messages 105 via the network 104, directly to the devices 100. It is further recognized that the devices 100 can communicate with one or more web services 106 and associated application servers 110 via the networks 104.

Server Environment

Referring to FIG. 1, the web service 106 provides the information messages 105 which are used by the client application programs 302 (see FIG. 2) on the devices 100. Alternatively, or in addition, the web service 106 may receive and use the information messages 105 provided by the client application programs 302 executed on the devices 100, or perform tasks on behalf of client application programs 302 executed on the devices 100. The web service 106 can be defined as a software service, which can implement an interface such as expressed using Web Services Description Language (WSDL) registered in Universal Discovery Description and Integration (UDDI) in a web services registry, and can communicate through messages 105 with client devices 100 by being exposed over the network 104 through an appropriate protocol such as the Simple Object Access Protocol (SOAP). In some implementations, SOAP is a specification that defines the XML format for the messages 105, including a well-formed XML fragment enclosed in SOAP elements. SOAP also supports document style applications where the SOAP message 105 is a wrapper around an XML document. A further optional part of SOAP defines the HTTP binding (i.e. header), whereas some SOAP implementations support MSMQ, MQ Series, SMTP, or TCP/IP transport protocols. Alternatively, the web service 106 may use other known communication protocols, message 105 formats, and the interface may be expressed in other web services languages than described above.

Client Environment

Figure 2:
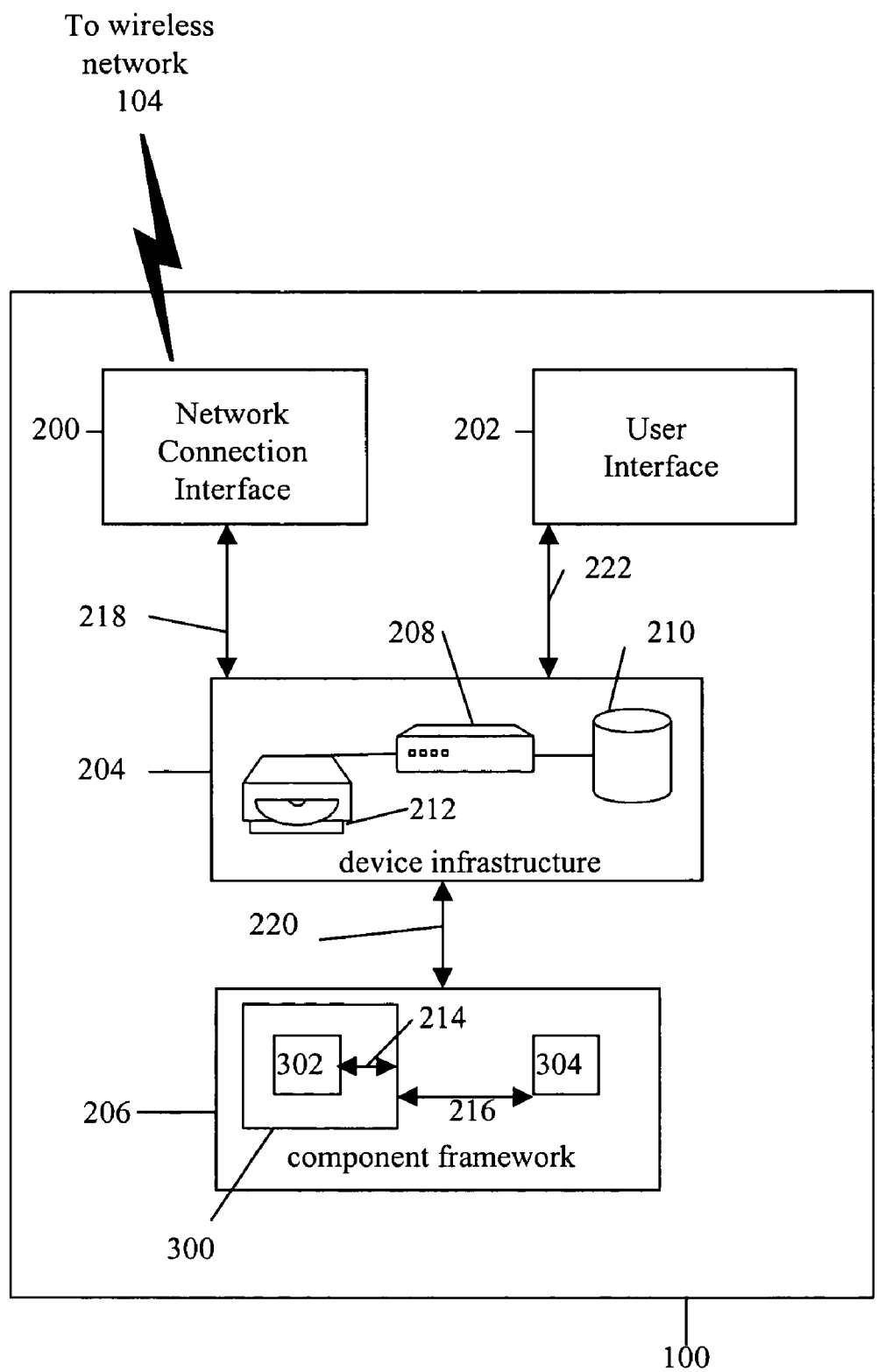
FIG. 2 is a block diagram of a generic device of FIG. 1.

Referring to FIG. 2, the component applications 302 are transmitted via the network 104 and loaded into a memory module 210 of a device infrastructure 204 of the device 100. Alternatively, the component applications 302 may be loaded via a serial connection, a USB connections, or a short-range wireless communication system such as IR, 802.11(x) Bluetooth™ (not shown). Once loaded onto the device 100, the component applications 302 can be executed by a component framework 206 on the device 100, which can convert the component applications 302 into native code, which is executed by a processor 208 in the device infrastructure 204. Alternatively, the component applications 302 may be interpreted by another software module or operating system on the device 100. In any event, the component applications 302 are run in a terminal runtime environment provided by the device 100, such that the runtime environment is an intelligent software framework that provides a set of basic services to manage and execute typical application 302 behaviour (e.g. persistence, messaging, screen navigation and display).

Referring again to FIG. 1, the client runtime environment provided by the devices 100 can be configured to make the devices 100 operate as web clients of the web services 106. It is recognized that the client runtime environment can also make the devices 100 clients of any other generic schema-defined services over the network 104. The client runtime environment of the devices 100 is preferably capable of generating, hosting and executing the client application programs 302 (which are in the form of component applications—see FIG. 4 and description herein below) on the device 100. Further, specific functions of the client runtime environment can include such as but not limited to support for language, coordinating memory allocation, networking, management of data during I/O operations, coordinating graphics on an output device of the devices 100 and providing access to core object oriented classes and supporting files/libraries. Examples of the runtime environments implemented by the devices 100 can include such as but not limited to Common Language Runtime (CLR) by Microsoft and Java Runtime Environment (JRE) by Sun Microsystems.

The terminal runtime environment of the devices 100 preferably supports the following basic functions for the resident executable versions of the client application programs 302 (see FIG. 2), such as but not limited to:

provide a communications capability to send messages 105 to the Web Services 106 or messages 105 to any other generic schema defined services connected via the network 104 to the devices 100;

provide data input capabilities by the user on an input device of the devices 100 to supply data parts for Web Services' 106 outgoing messages 105 (messages to the service);

provide data presentation or output capabilities for Web Services' 106 response messages 105 (incoming messages) or uncorrelated notifications on the output device;

provide data storage services to maintain local client data in the memory module 210 (see FIG. 2) of the device 100; and provide an execution environment for a scripting language for coordinating operation of the application components 400, 402, 404, 406 (see FIG. 4) of the client application programs 302.

Figure 4:
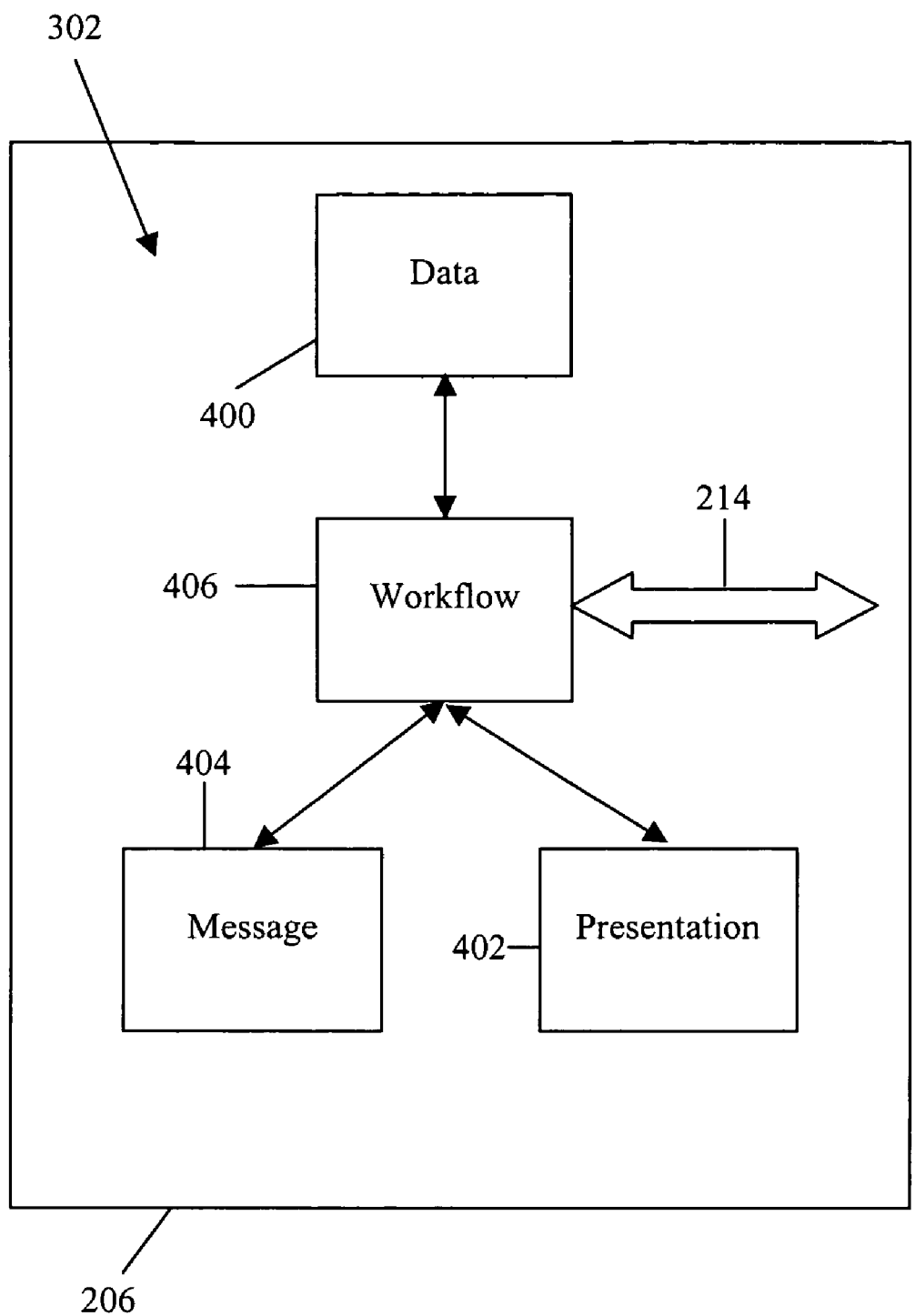
FIG. 4 is a block diagram of a component application program of FIG. 2.
Figure 5:
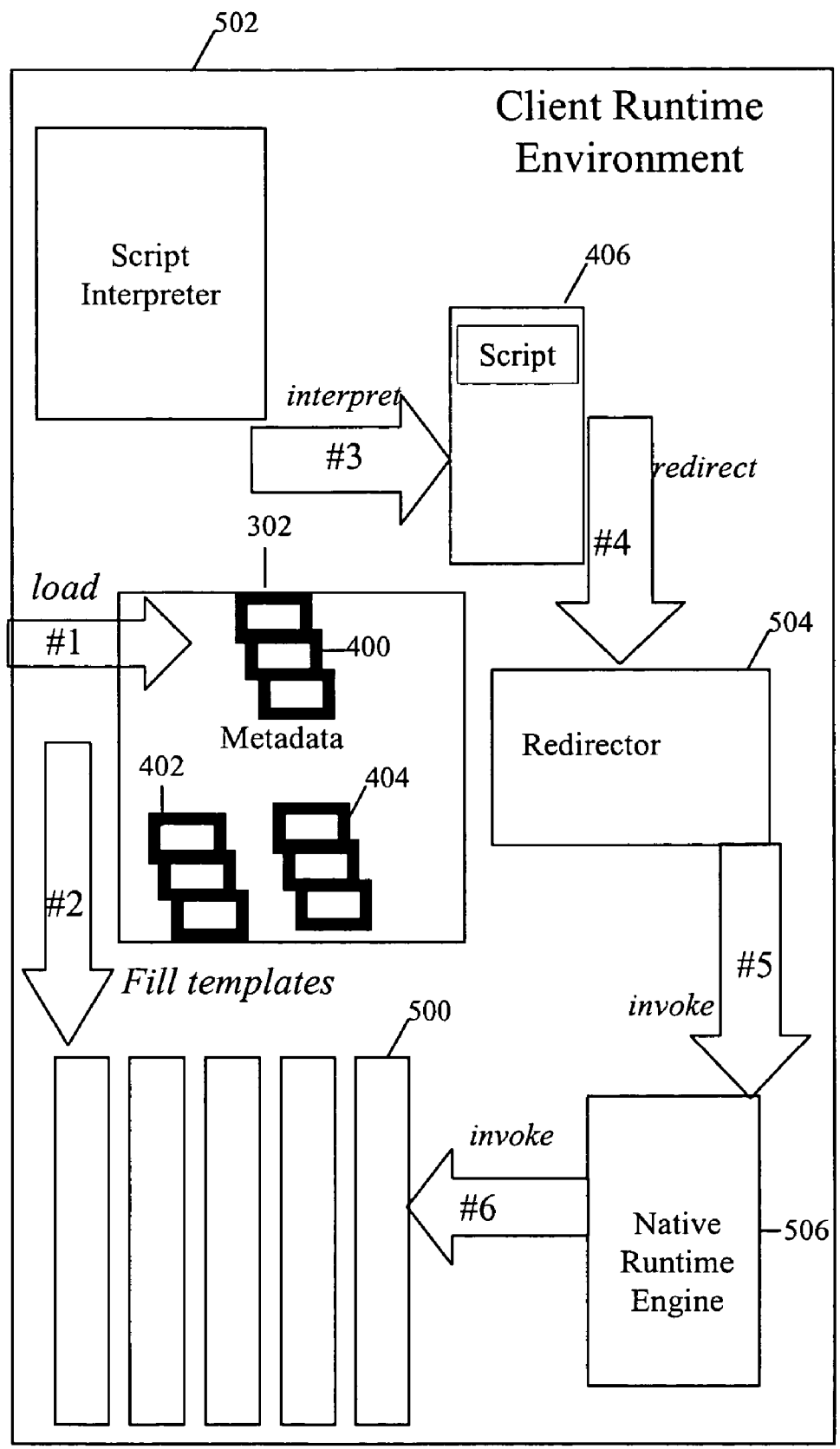
FIG. 5 shows a representative application packaging and hosting model for the system of FIG. 1.

Referring to FIGS. 2, 4 and 5, the client runtime (for example provided by the component framework 206) loads metadata contained in the component 400, 402, 404, 406 definitions and the builds the executable version of the application program 302 on the device 100, via for example an application container 300. There are, such as but not limited to, two operational models for client runtime: template-based native execution and metadata-based execution. With the template-based native execution model the runtime hosts data, message, and screen templates 500 pre-built on the device 100 using the native code. When the application program 302 definition is loaded, the client environment provided by the component framework 206 fills the templates 500 with metadata-defined parameters from the components 400, 402, 404 and builds the executable client application program 302 in the native format. The workflow script (for example ECMAScript) of the workflow component 406 could be either converted to native code or executed using an appropriate script interpreter 502 (e.g., ECMAScript Interpreter) to a native code redirector 504, where the redirector 504 interprets calls to the scripting language into operations on native components through a native runtime engine 506. With the metadata-based execution, the runtime environment of the component framework 206 either keeps component 400, 402, 404, 406 definitions in XML (for example), which are parsed during execution time or uses native representation of XML (for example) nodes. During execution, the native runtime engine 506 operates on definitions of the components 400, 402, 404, 406 rather than on native component entities.

Therefore, the native client runtime environment provides an interface for the client application programs 302 to the device 100 functionality of the processor 208 and associated operating system of the device infrastructure 204. The runtime environment preferably supplies a controlled, secure and stable environment on the device 100, in which the component application programs 302 execute. The runtime environment provisions the definitions of the components 400, 402, 404, 406 to create the actual web client specific for each respective device infrastructure 204 of the device 100. It is recognized for the sake of simplicity that the following description hereafter will refer to the client runtime environment being provided by the component framework 206, as an example only.

Communication Device

Referring to again to FIG. 2, the devices 100 are devices such as but not limited to mobile telephones, PDAs, two-way pagers or dual-mode communication devices. The devices 100 include a network connection interface 200, such as a wireless transceiver or a wired network interface card or a modem, coupled via connection 218 to a device infrastructure 204. The connection interface 200 is connectable during operation of the devices 100 to the network 104, such as to the wireless network 102 by wireless links (e.g., RF, IR, etc.), which enables the devices 100 to communicate with each other and with external systems (such as the web service 106) via the network 104 and to coordinate the requests/response messages 105 between the client application programs 302 and the service 106 (see FIG. 1). The network 104 supports the transmission of data in the requests/response messages 105 between devices and external systems, which are connected to the network 104. The network 104 may also support voice communication for telephone calls between the devices 100 and devices which are external to the network 104. A wireless data transmission protocol can be used by the wireless network 102, such as but not limited to DataTAC, GPRS or CDMA.

Referring again to FIG. 2, the devices 100 also have a user interface 202, coupled to the device infrastructure 204 by connection 222, to interact with a user (not shown). The user interface 202 includes one or more user input devices such as but not limited to a QWERTY keyboard, a keypad, a trackwheel, a stylus, a mouse, a microphone and the user output device such as an LCD screen display and/or a speaker. If the screen is touch sensitive, then the display can also be used as the user input device as controlled by the device infrastructure 204. The user interface 202 is employed by the user of the device 100 to coordinate the requests/response message messages 105 over the system 10 (see FIG. 1) as employed by client application programs 302 of a component framework 206, further described below.

Referring again to FIG. 2, operation of the device 100 is enabled by the device infrastructure 204. The device infrastructure 204 includes the computer processor 208 and the associated memory module 210. The computer processor 208 manipulates the operation of the network interface 200, the user interface 202 and the component framework 206 of the communication device 100 by executing related instructions, which are provided by an operating system and client application programs 302 located in the memory module 210. Further, it is recognized that the device infrastructure 204 can include a computer readable storage medium 212 coupled to the processor 208 for providing instructions to the processor and/or to load/update client application programs 302 in the memory module 210. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Component Framework of Device

Referring again to FIG. 2, the component framework 206 of the device 100 is coupled to the device infrastructure 204 by the connection 220. The client runtime environment the device 100 is provided by the component framework 206, and is preferably capable of generating, hosting and executing the client application programs 302 (which are in the form of component applications—see below) from meta-data definitions. Therefore, component framework 206 provides the native client runtime environment for the client application programs 302 and is an interface to the device 100 functionality of the processor 208 and associated operating system of the device infrastructure 204. The component framework 206 provides the runtime environment by preferably supplying a controlled, secure and stable environment on the device 100, in which the component application programs 302 execute in the application container 300, for example. The application container 300 can be referred to as a smart host container for the client application program 302, and can be responsible for analyzing message meta-data (of the messages 105—see FIG. 1) and for updating the representation of the meta-data in the memory module 210.

Figure 3:
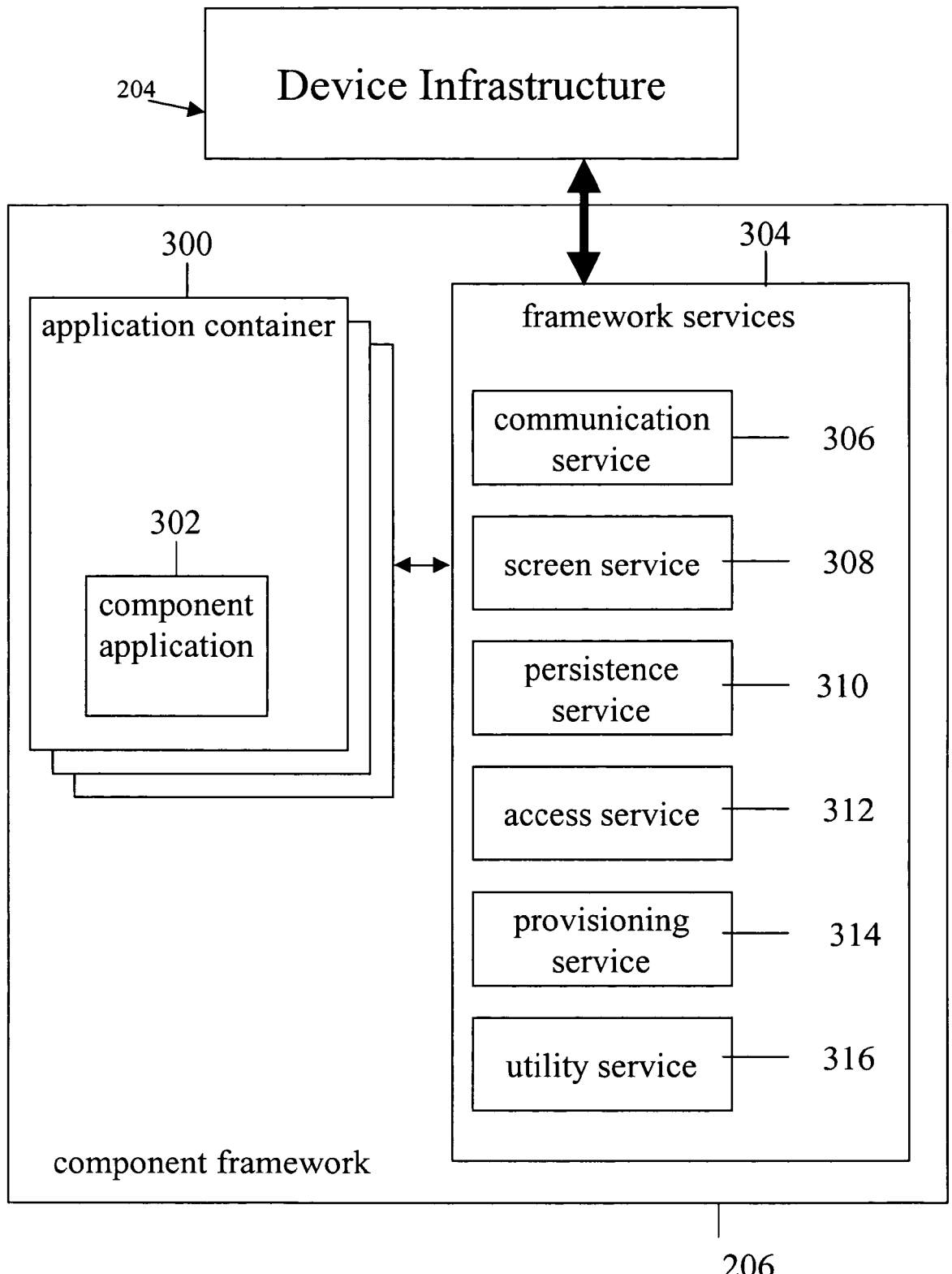
FIG. 3 is a block diagram of a component framework of the device of FIG. 2.

Referring to FIG. 3, the component framework 206 can be used to execute the client application programs 302 (such as Web Service client applications) within the terminal runtime environment and can support access to Web Service 106 and associated application servers 110 (see FIG. 1), via the request/response messages 105. The component application programs 302 comprise software applications which are executed by the component framework 206. The component framework 206 creates the application container 300 for each component 400, 402, 404, 406 (see FIG. 4) of the application program 302, each time that the component application program 302 is executed. The application container 300 loads the components 400, 402, 404, 406 of the application program 302 and can create native code which is executed by the processor 208 in the device infrastructure 204. The component framework 206 therefore provides the host application containers 300 for provisioning the definitions of the components 400, 402, 404, 406 to create the actual web client specific for each respective device infrastructure 204 of the communication devices 100. The application container 300 can provision the component application 302 as per the template-based native execution and metadata-based execution models as described above, by way of example only.

Referring again to FIG. 3, the component framework 206 can also provide framework services 304 (a standard set of generic services) to the client application programs 302, in the event certain services are not included as part of the components 400, 402, 404, 406 (see FIG. 4) or received as separate components (not shown) as part of the component application program 302. The application program 302 has communications 214 with the application container 300, which can coordinate communications 216 with the framework services 304, as needed. The framework services 304 of the component framework 206 coordinate communications via the connection 220 with the device infrastructure 204. Accordingly, access to the device infrastructure 204, user interface 202 and network interface 200 is provided to the client application programs 302 by the component framework 206 and associated services 304. It is recognized that a portion of the operating system of the device infrastructure 204 (see FIG. 2) can represent the application container 300 and any services of the framework services 304.

The framework services 304 can include such as but not limited to a communication service 306, a presentation/screen service 308, a persistence service 310, an access service 312, a provisioning service 314 and a utility service 316. The communication service 306 manages connectivity between the component application programs 302 and the external system 10, such as the messages 105 and associated data sent/received in respect to the web service (by the communication service 306) on behalf of the component applications 302. As further described below with reference to FIGS. 8a,b, 9a,b, 10a,b the communication service 306 can be used to implement a series of mappings 800 (see FIG. 8a). The presentation service 308 manages the representation of the component application programs 302 as they are output on the output device of the user interface 202 (see FIG. 2). The persistence service 310 allows the component application programs 302 to store data in the memory module 210 (see FIG. 2) of the device infrastructure 204. It is recognised the persistence service 310 can be used to coordinate the modification/creation of data instances of the data components 400 linked to the message components 404 via the mappings 800 (see FIG. 8a). The access service 312 provides the component application programs 302 access to other software applications which are present on the communication device 100. The provisioning service 314 manages the provisioning of software applications on the communication device 100. Application provisioning can include requesting and receiving new and updated component application programs 302, configuring component application programs 302 for access to services which are accessible via the network 104, modifying the configuration of component application programs 302 and services, and removing component application programs 302 and services. The utility service 316 is used to accomplish a variety of common tasks, such as performing data manipulation in the conversion of strings to different formats.

It is recognized that the framework services 304 of the communication device 100 can provide functionality to the component application programs 302, which can include the services described above. Further, the framework services 304 can be integrated with the components 400, 402, 404, 406 of the application 302 rather than provided as a separate framework 304. In any event, the component application programs 302 can have access to the functionality of the communication device 100 through integrated and/or separate framework services 304.

Example Component Application Program

Referring to FIG. 2, the Web Service (for example) client application programs 302 are executed within the terminal runtime environment of the component framework 206 and support access to Web Service operations provided by the service 106 (see FIG. 1). WSDL and SOAP protocol definitions clearly imply a messages/data pattern. In a WSDL Web Service definition, the operations are defined using the notion of messages and data parts, which are used to define the Web Service client application programs 302 as a set of the related data 400 and the message 404 components (see FIG. 4).

Referring to FIG. 4, a block diagram of the component application program 302 comprises the data components 400, the presentation components 402 and the message components 404, which are coordinated by workflow components 406 through communications 214 with the application container 300. The structured definition language can be used to construct the components 400, 402, 404 as a series of metadata records, which consist of a number of pre-defined elements representing specific attributes of a resource such that each element can have one or more values. Each metadata schema typically has defined characteristics such as but not limited to; a limited number of elements, a name of each element, and a meaning for each element. Example metadata schemas include such as but not limited to Dublin Core (DC), Anglo-American Cataloging Rules (AACR2), Government Information Locator Service (GILS), Encoded Archives Description (EAD), IMS Global Learning Consortium (IMS), and Australian Government Locator Service (AGLS). Encoding syntax allows the metadata of the components 400, 402, 404 to be processed by the device infrastructure 204 (see FIG. 2), and encoding schemes include such as but not limited to XML, HTML, XHTML, XSML, RDF, Machine Readable Cataloging (MARC), and Multipurpose Internet Mail Extensions (MIME).

Referring again to FIG. 4, the data components 400 define data entities which are used by the component application program 302, including application data represented in for example native code or XML. Examples of data entities which data components 400 may describe are orders, users, and financial transactions. Data components 400 define what information is required to describe the data entities, and in what format the information is expressed. For example, the data component 400 may define such as but not limited to an order which is comprised of a unique identifier for the order which is formatted as a number, a list of items which are formatted as strings, the time the order was created which has a date-time format, the status of the order which is formatted as a string, and a user who placed the order which is formatted according to the definition of another one of the data components 400. Since data parts (elements) are usually transferred from message 105 to message 105 according to Web Services' 106 choreography rules, preferably there is persistence of data components 400. Data components 400 may be dynamically generated according to Web Services' 106 choreography definitions (if available) or defined by the application designer based on complex type definitions and/or message correlation information. It is recognised that the message components 404 can be linked via the mappings 800 to the data components 400 (see FIG. 8a), as further described below.

Referring again to FIG. 4, the message components 404 define the format of messages used by the component application program 302 to communicate with external systems such as the web service 106, and include message data represented in for example native code or XML. For example, one of the message components 404 may describe such as but not limited to a message for placing an order which includes the unique identifier for the order, the status of the order, and notes associated with the order. Message component 404 definitions written in the structured definition language can uniquely represent (and map to) WSDL messages, and can be generated dynamically at runtime. Accordingly, the dynamic generation can be done for the component definitions for client application messages 105, and associated data content, from standard Web Service metadata in the definition language used to express the web service interface, for example such as but not limited to WSDL and BPEL. Web Service messages 105 are defined within the context of operation and there is defined correlations between the message components 404 in the component application program 302 definition. This correlation could be done using predefined message parameters and/or through separate workflow components 406, as further defined below.

Referring again to FIG. 4, the presentation components 402 define the appearance and behavior of the component application program 302 as it displayed by the user interface 202. The presentation components 402 can specify GUI screens and controls, and actions to be executed when the user interacts with the component application 302 using the user interface 202. For example, the presentation components 402 may define screens, labels, edit boxes, buttons and menus, and actions to be taken when the user types in an edit box or pushes a button. The majority of Web Service consumers use a visual presentation of Web Service operation results, and therefore provide the runtime environment on their devices 100 capable of displaying user interface screens.

Referring again to FIG. 4, the workflow components 406 of the component application program 302 define processing that occurs when an action is to be performed, such as an action specified by a presentation component 402 as described above, or an action to be performed when messages 105 (see FIG. 1) arrive from the system 10. Presentation workflow and message 105 processing are defined by the workflow components 406. The workflow components 406 are written as a series of instructions in a programming language or a scripting language, such as but not limited to ECMAScript, and can be compiled into native code and executed by the application container 300, as described above. An example of the workflow components 406 may be to assign values to data, manipulate screens, or send the message 105. The workflow component 406 supports a correlation between the messages 105 and defines application flow as a set of rules for operations on the other components 400, 402, 404. Multiple workflow components can be defined with respect to a given application program 302.

ECMA (European Computer Manufacturers Association) Script is a standard script language, wherein scripts can be referred to as a sequence of instructions that is interpreted or carried out by another program rather than by the computer processor. Some other examples of script languages are Perl, Rexx, VBScript, JavaScript, and Tcl/Tk. The scripting languages, in general, are instructional languages that are used to manipulate, customize, and automate the facilities of an existing system, such as the devices 100. In such systems, useful functionality is already available through the user interface 202 (see FIG. 2), and the scripting language is a mechanism for exposing that functionality to program control. In this way, the device 100 is said to provide the host runtime environment of objects and facilities which completes the capabilities of the scripting language.

Accordingly, referring to FIG. 4, the client application programs 302 can be defined as a set of platform-neutral component definitions, namely for data 400 and message 404 components, and presentation components 402 using XML (or any other suitable structured definition language). The workflow components 406 can be defined using ECMAScript (or any other suitable platform-neutral scripting language). The client runtime environment of the component framework 206 (see FIG. 2) can generate component templates based on meta-definitions, as further described below, when the components 400, 402, 404, 406 of the component application program 302 are provisioned on the device 100. With a large variety of terminal runtime environments, the cross-platform standards such as XML or ECMAScript can be used to define application component metadata instead of pre-building the component application programs 302. This delayed binding can allow generic application definitions of the component application programs 302 to be run on a wide variety of terminal system environments, represented by various different devices 100.

Expressing the data 400, message 404, and presentation 402 components using XML or its derivatives, and the workflow component 406 using the ECMAScript language or its subset, can allow an application developer to abstract the Web Service client from any specific platform or environment and implement in principle "develop once run everywhere" applications. The following example shows how a Web Services client application program 302 could be expressed using a structured definition language, such as but not limited to XML, and a platform neutral scripting/programming language, such as but not limited to ECMAScript, defined components:

Example XML Data Components 400

```
<data name="Order">
    <item name="orderId" type="Number" key="true"/>
    <item name="items" type="String" array="true"/>
    <item name="user" comp="true" compName="User"/>
    <item name="orderStatus" type="String"/>
</data>
```
...

Example XML Message Components 404

```
<msg name="ordConfirmation" type="response"
action="mhConfirmation">
    <part name="orderId" type="String" />
    <part name="status" type="String" />
</msg>
...
```

Example XML Presentation Components 402

```
<screen name="scrConfirmation" title="Order
Confirmation" param="Order">
    <layout type="vertical">
    <widget type="label" value="Order Confirmation Result:"/>
        < widget type="edit" value="@Order.OrderStatus@"/>
</layout>
...
    <menu>
        <item label="Continue" navigate="@scrMain@"/>
        ...
    </menu>
</screen>
...
```

Example ECMAScript Workflow Components 406

```
<actions>
    <function name="mhConfirmation">
        key = ordConfirmation.orderId;
        order = Order.get(key);
        order.orderStatus = ordConfirmation.status;
        scrConfirmation.display(order);
    </function>
    ...
</actions>
```

Referring to FIG. 4, as given above, it can be seen that the message components 404 relay the required data for the input and output of the messages 105. The corresponding data components 400 coordinate the storage of the data in the memory module 210 (see FIG. 2) of the device 100 for subsequent presentation on the user interface 202 (see FIG. 2) by the presentation components 402. The workflow components 406 coordinate the transfer of data between the data 400, presentation 402, and message 404 components.

Further, the component application architecture can provide a relatively small application download size (consisting of component definitions only) as compared to hard coded native applications, and an effective data storage and persistence model. The client runtime is capable of storing and updating atomic data entities directly vs. manipulating rendered presentations such as HTML pages for browser applications.

Example Operation of Component Application Model

Figure 6:
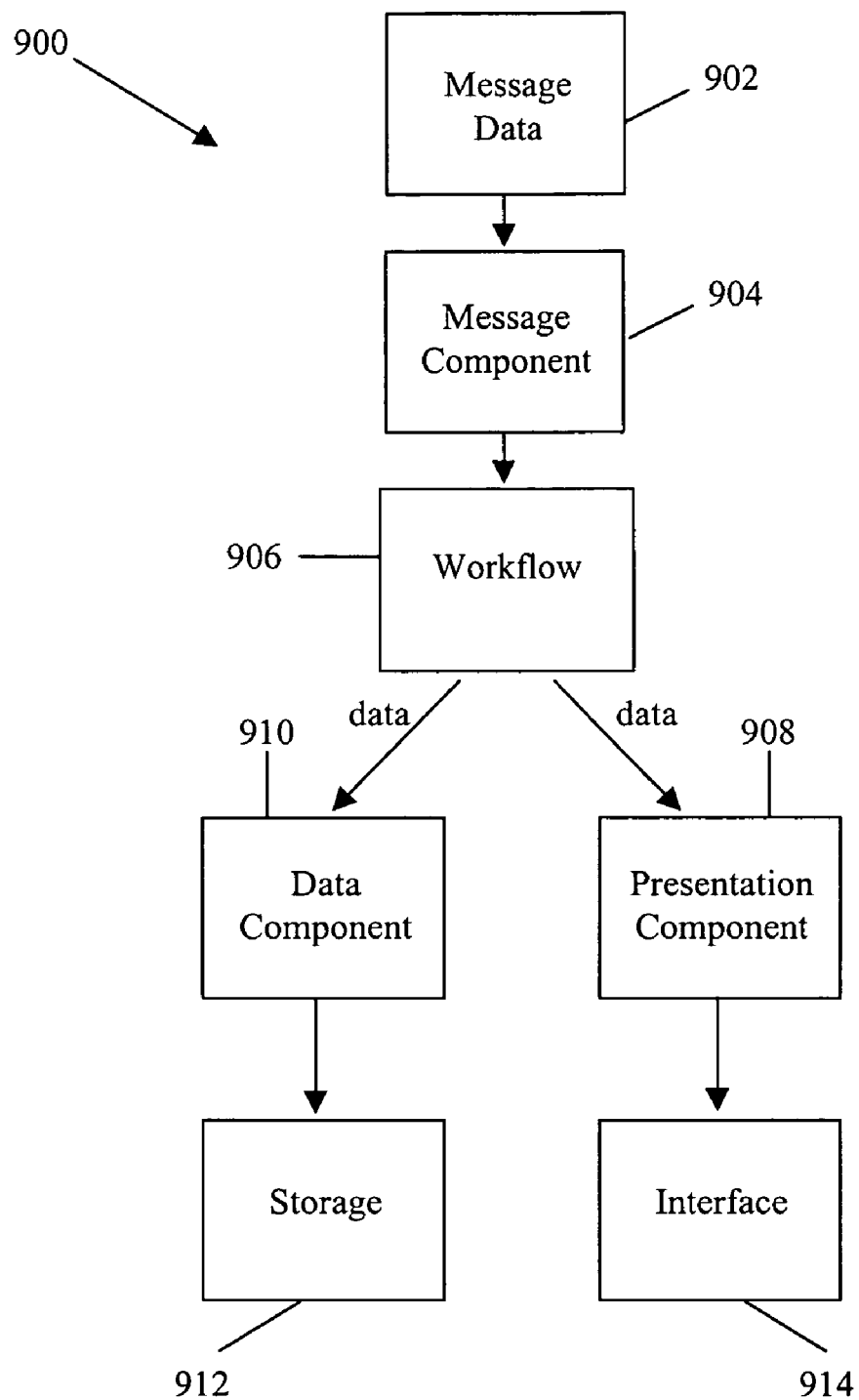
FIG. 6 shows an example method of implementing the component application program of FIG. 4.

Referring to FIGS. 1, 3 and 6, for example, operation 600 shows when the device 100 receives 902 the response message 105 containing message data, the appropriate workflow component 406 interprets 904 the data content of the message 105 according to the appropriate message component 404. The workflow component 406 then processes 906 the data content and inserts 910 the data into the corresponding data component 400 for subsequent storage 912 in the memory module 210 (see FIG. 2). Further, if needed, the workflow component 406 also inserts 908 the data into the appropriate presentation component 402 for subsequent display 914 on the user interface 202 (see FIG. 2).

Figure 7:
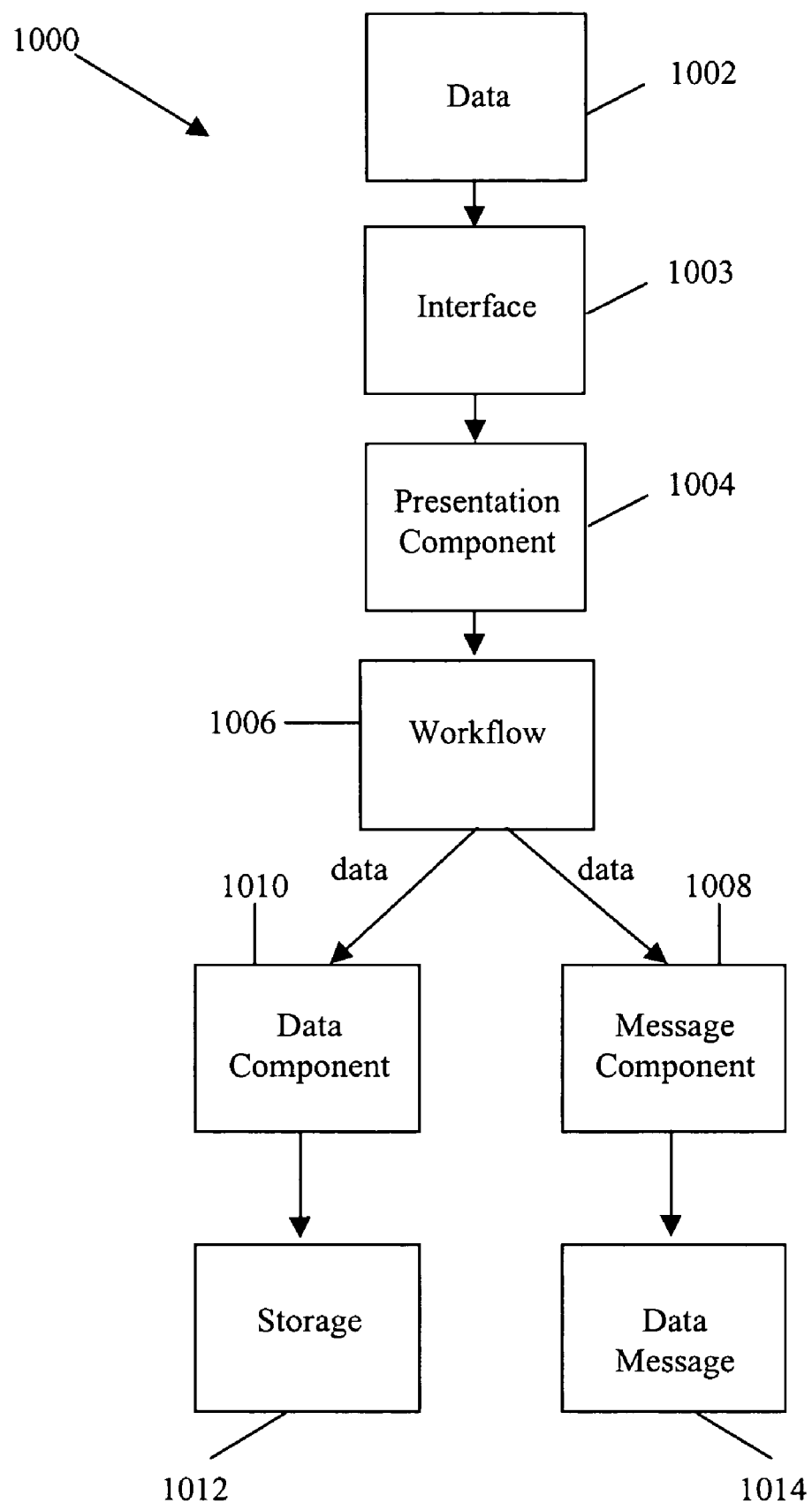
FIG. 7 shows a further example method of implementing the component application program of FIG. 4.
Figure 11:
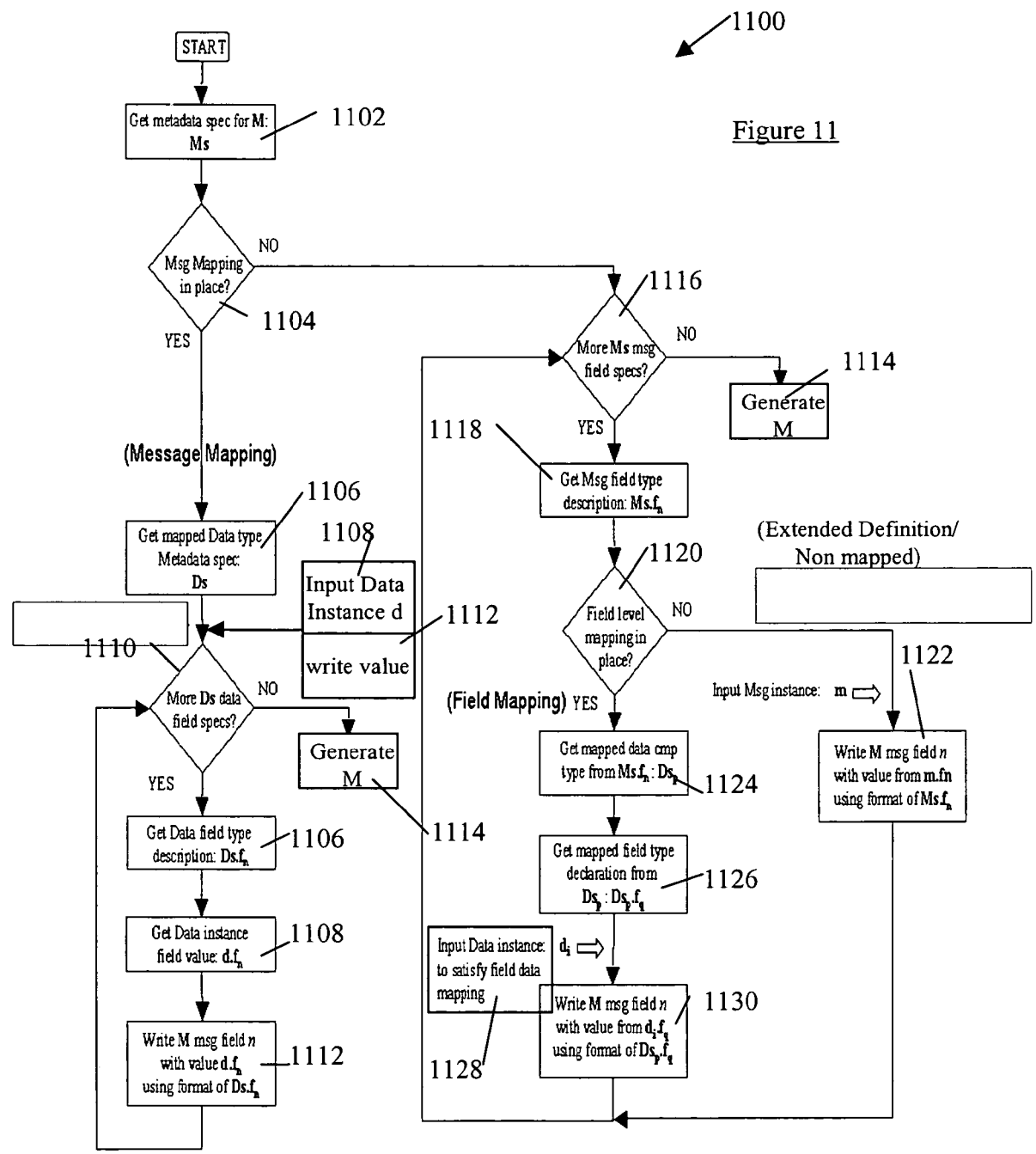
FIG. 11 demonstrates an algorithm for producing an outgoing message with effect of message mappings of FIGS. 8a,b, 9a,b and 10a,b.

Referring to FIGS. 1, 3 and 7 operation 1000 shows data input 1002 for an action, such as pushing a button or selecting a menu item, which the user performed 1003 on a user-interface element through the user interface 202 (see FIG. 2). The relevant workflow component 406 interprets 1004 the input data according to the appropriate presentation component 404 and creates 1006 data entities which are defined by the appropriate data components 400. The workflow component 406 then populates 1010 the data components 400 with the input data provided by the user for subsequent storage 1012 in the memory module 210 (see FIG. 2). Further, the workflow component 406 also inserts 1008 the input data into the appropriate message component 404 for subsequent sending 1014 of the input data as data entities to the web service in the message 105, as defined by the message component 404.

Mapping Between Data and Message Components

As described above with reference to FIG. 4, the wireless component applications 302 are expressed as a collection of message 404, data 400 and components 402, 406, including information that specifies how these components interact. The application 302 is expressed using a structured definition language such as XML. It is noted that the expression of both messages 404 and data 400 as components bear certain similarities:

each component 400, 404 is identified by a unique name; and each component 400, 404 specifies one or more subfields consisting of name and declared type.

In practice, typically the expression of the components 400, 404 by the developer can be almost identical, while the behaviour of each of the components 400, 404 of the application 302 is distinct. Therefore, by recognizing the fact that message 105 (see FIG. 1) content is often generated from some underlying data element, and in light of the similarities between expression of these components 400, 404, it is convenient to introduce certain mappings 800 (see FIG. 8a) to the expression of message components 404, as further described below. These mappings 800 are essentially shortcuts to the expression of the message 105 that specify how the message's definition is obtained regarding the message component 404, and how the message component 404 behaves at runtime during execution of the application 302. The mapping 800 is a stated relationship between the message component 404 definition and the data component 400 definition. In relation to expression of the message component 404, using the mapping 800 can reduce the amount of metadata required to describe the component 404. Thus use of the mapping 800 can have a direct effect on the amount of "code" required to describe the application 302. In relation to how the component 404 behaves at runtime, the mapping 800 specifies how linked data elements (described by the data component 400) are resolved and affected by message state. In this regard, specifying the mapping 800 can reduce the need for the developer to provide additional specific message handling code in the application 302.

Mapping Resolution Contract

Referring again to FIGS. 1 and 8a, the application and corresponding services 304 rely upon a mapping resolution contract or mapping rule having a unique identifier 802 (see FIG. 8a). This mapping rule states that any mapping 800 attached to the data component 400 will map exactly one key field 802 per mapped data type 804. This mapping rule provides for unique identification and modification of the data instance affected by the mapping 800. The mapping rule states that the mapping 800 isolates an instance of the data component 400 to which the message content of the corresponding message component 404 is linked. Data component 400 instances are resolved by the unique identifier 802 (e.g. a key). It is noted that the composition of this identifier 802 could be such as but not limited to a simple primary key or a composite key arising from more than one field. A single field 804 (such as a component name) in the Data definition of the data component 400 is identified as referenced by this identifier 802. The mapping resolution contract provides that exactly one primary key field 802 is involved in the mapping 800 to each linked data component 400. This one to one property of the mapping 800 provides for the unique the resolution of data instances to which incoming message data applies, as further described below. A particular data instance is represented as a selected data component 400 that is assigned data values to each of the field names 808. A message instance 806 is represented as a selected message component 404 that is assigned data values to contained message field(s) through the mappings 800.

Two types of mappings 800 are described: field level mappings 901, and message level mappings 801. The following elaborates on how message 404 to data 400 component mappings 800 may be expressed, and specify a runtime resolution contract that exists to determine uniquely where message content is to be applied.

Message Level Mappings 801

Referring again to FIG. 8a, the Message level Mapping 801 is a mapping 800 from the message component 404 directly to the named data component 400 definition, such that message 806 field properties (message instance) are identical to those on the mapped data component. Message level mappings 801 state that the message instance 806 derives its complete specification from the linked data element of the data component 400. All fields described in the linked data component 400 will be present in the message instance 806, observing both field names 808, type declarations 810 and field order. For example, this type of message level mapping 801 can be convenient when the incoming or outgoing message instances 806 exactly duplicate the information represented by the data instance of the data component 400. Referring to FIG. 8b, a sample message level mapping 801 between the Order data component 400 and the submitOrder message component 404 is illustrated. The mapping resolution contract for the mapping 801 is satisfied by the implicit linking of orderId primary key field 802. A sample structured definition language description (e.g. XML) of this relationship is provided in FIG. 8b. It is apparent from the XML expression that the size of the application 302 definition (see FIG. 4) can be reduced by introducing this mapping 801, as the listing of arguments 812 of the data component 400 is not repeated in the linked message component 404.

Field Level Mappings 901

The Field level Mapping 901 (see FIG. 9a, 9b) provides a mapping 800 from a particular field 904 of the message component 404 definition to the named field 808 of the named data component 400 definition. Field level mappings 901 may arise where a more flexible arrangement of mappings 800 is required. In this configuration, each field mapping 901 specifies a linkage between each selected field 904 of the message instance 906 and the field 808 of the data instance corresponding to the data component 400. There may be any number of such field mappings 901. Field mappings 901 may involve only one target data component 400 (one-to-one linkage) or multiple data components 400 may be linked to the message instance 906 through separate field mappings 901 (one-to-many linkage). In order to satisfy the mapping resolution contract, the key field 802 is included for every data component 400 that is linked to the message component 404.

Referring to FIG. 9a, one-to-one mapping 901 arrangements incorporate a link to a single data component 400. One field mapping 901 is made to the field representing the primary key 802 of the data component 400, thus linking the message instance 906 with the data instance of the data component 400. Other mappings 901 are made between the selected message fields 904 of the component 404 and corresponding data fields 808 of the component 400. FIG. 9a depicts a typical field level mapping 901 relationship where a subset of the Part fields 808 are linked to the priceReduction message field 904. The mapping resolution contract is satisfied by making the link 901 to the partNo field which is identified as the key field 802 of Part. A sample XML expression for these relationships is provided in FIG. 9b, where Key field mapping 901 is shown in bold. It is recognised that the message instance 906 can have more than one message field 904, each mapped 901 to a respective data field 808 under the same key 802 (i.e. the message component 404 can be linked to two or more data fields 808 of the data component 400 using the same key 802).

Complex Mappings 1001

Referring to FIGS. 10a and 10b, a complex mapping 1000 arrangement consists of field level mappings 901 to two or more data components 400. As with the one-to-one mapping case of FIGS. 8a,b, different unique ones of the primary key field 802 mapping is provided for every data component 400 linked through the set of field mappings 901. FIG. 10b shows an XML representation of the relationships between the orderUpdate message 404 and the Order and Inventory data components 400. For each of the two data components 400 linked, a respective primary field mapping 901 with keys 802 is in place; orderId field key 802 for Order 400 and partNo field key 802 for Inventory 400. This satisfies the mapping resolution contract. These primary key field mappings 901 are shown in bold.

In view of the examples shown in FIGS. 8a,b, 9a,b, and 10a,b, other mapping 800 configurations are possible. Examples of such include such as but not limited to Extended Definition, Message Prototyping, and Arrival Event Processing, as further described below. An Extended Definition is a message component 404 that extends the message 801 or field mapping 901 configuration by defining additional un-mapped fields 904. This extended message instance 906 may extend its definition, in the presence of mappings 801, 901, by adding fields 904 that are not mapped to a respective data component 400 but rather complete their own specification within the message component definition 404. These fields 904 may be added to either the message 906 that has one or more field mappings 901, or the message 906 that is mapped 801 to a respective data component 400. Extended definition can provide an additional measure of flexibility to the specification of the mapped message 906. Message Prototyping can be defined as the ability to extend the stated definition of another message component 404. This mechanism has a similar effect as in object oriented inheritance; all the declared fields 904 of the parent message 906 will be available to the extending message 906. With regard to mapping 801, 901 relationships, the extending message mappings 801,901 could override any mapping specifications stated on the parent message 906. For Message Arrival Event Processing, the mapping mechanism can be further enhanced by permitting the association of additional processing code to the message reception. The body of processing code can be identified through the specification of the message component 404 through application XML. The processing code may be a script (such as ECMAScript) embodied in the application 302 (e.g. a workflow component 406), or may identify a standard native transformation offered by the Device Runtime environment of the component framework 206 (see FIG. 2). Handling of message arrival event processing is further discussed below.

Message Generation 1100

Referring to FIGS. 8a,b, 9a,b, and 11, for the origination of message instances 906, the message to data mappings 801, 901 define the source and format for content that the message instance 906 will carry. The message format may be derived identically from the linked data component 400 (message mapping 801) or may be defined by the aggregate effect of multiple data component 400 relationships (field level mapping 901). Finally, some message fields can carry their own declarations (extended definition). In order to generate the originating message instance 906 that specifies either type of mapping 801, 901, all dependent data component 400 instances are supplied to the input of the generation process 1100. In addition the use of the extended declaration of fields 904 implies that the supplied message instance 906 provides the necessary field value.

Referring to FIGS. 9a,b and 11, the ultimate generation 1114 of a message instance M (corresponding to message instance 806,906) is done using a message declaration Ms (corresponding to message component 404). In the case of direct message mapping 801, the mapped data component definition Ds (corresponding to data component 400) is used with input data instance d to determine the ultimate message instance M. In step 1102, the message component Ms is obtained and in step 1104, a decision is made by the device runtime environment (for example the communication service 306—see FIG. 3) by examining the component Ms to see whether message level mapping 801 is present. In the YES case, the metadata declaration Ds is obtained 1106 as defined by the mapping 801. The service 306 inputs 1108 the data instance d values from the persistence service 310 and writes 1112 in the message field 904 of the message instance Ms. The communication service 306 then analyses 1110 the data component Ds to see if there are any more data fields 808 for relating to the message instance M implied by the mapping 801. In the YES case, steps 1106, 1108, and 1112 are repeated until all of the fields 808 are included in the message instance M. The message instance M is then generated at step 1114.

In the case of field mapping 901 the data component definition $Ds_p$ and subordinate data field declarations $Ds.f_n$ are extracted by interrogating the message field level mapping 901 by the communications service 306. The appropriate field value 808 (d.f$_n$) from input data instance d$_i$ is added into the output message instance M. In step 1104 in the NO case, at step 1116 the communication service 306 determines whether there are field mappings 901 present, if no then the current contents of the message instance M are generated at step 1114, as noted above. Otherwise, the message field 904 descriptions are analysed 1118 and where field mappings 901 are in place 1120, the mapped data component type is obtained 1124, the mapped field type declaration is obtained 1126 from the data component Ds, and the data value of the data instance corresponding to the declaration is obtained 1128 from the persistence service 310. The values are then written in the corresponding message field 904 using the format of the data component Ds. If there are no further mappings 901, then the message instance M is generated at step 1114. Finally, in the case of an extended definition, the field format is taken directly 1122 from Ms, and it is expected that the field value is available through input message instance M. It is recognised that a combination of the message and field mappings 801, 901 as described above could be provided, in particular where more than one type of mapping is provided in the message instance M (i.e. multiple mappings 801, 901 for multiple components Ds linked to the message component Ms).

Message Processing 1200

Upon arrival of the message instance M (see FIG. 12), mappings 800 have one of two effects:

cause field d.f$_n$ updates in the mapped data component instance(s) d; and cause creation of a new data component instance(s) d with fields d.f$_n$ as determined by further mapping relationships 800.

Figure 12:
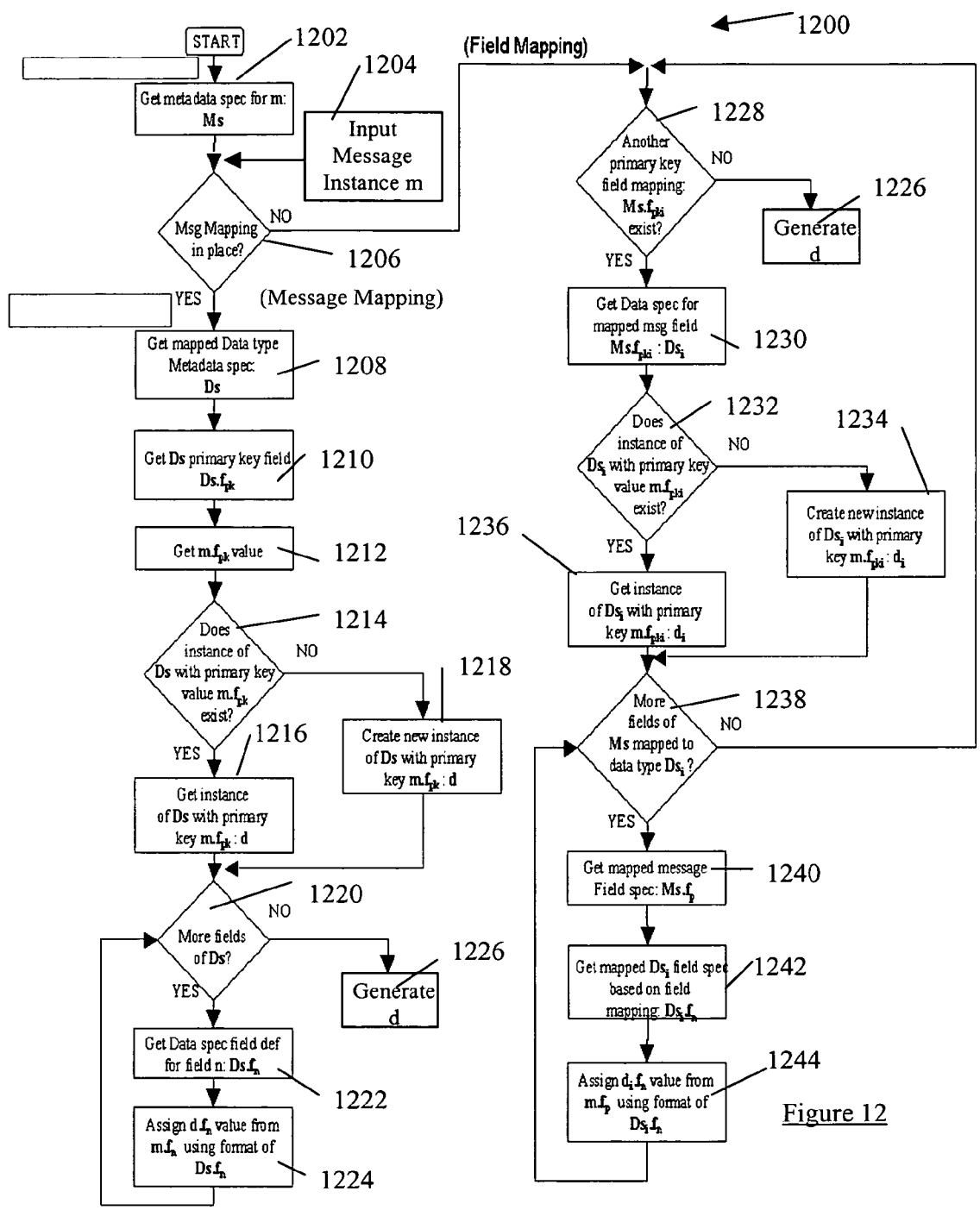
FIG. 12 demonstrates an algorithm for processing an incoming message with effect of message mappings of FIGS. 8a,b, 9a,b and 10a,b.

The data instance(s) d to which message field values M.f$_n$ apply is determined by virtue of the message to data mapping resolution contract. Data instances d are resolved by taking the message field values M.f$_n$ that are mapped to data primary key fields 802 (see FIG. 8a). Depending on the type of mappings 800 employed, there may be one (message mapping 801), or one or more (field mapping 901) data instances d affected by message M arrival at either the device 100 or the web service 106. For finding and updating data, the message field value M.f$_n$ corresponding to the message field 904 (see FIG. 9a), mapped to data primary key field, is not unique. A data instance d of the mapped typed already exists with the primary key value 802. The data instance d is resolved by this primary key value 802, and all other mappings 800 to this data type update the fields d.f$_n$ on this data instance d. It is noted that there may be more than one data instance d affected by this process when field mappings 901 are employed. For creating new data, the message field value M.f$_n$ corresponding to the message field mapped to data primary key field, is unique. As a result, a new instance of data d is created with the associated primary key field value 802. All subsequent mappings to this data type update the fields d.f$_n$ on the newly created data instance d. As with "find and update", there may be more than one data instance d created when using field mappings 901. For the data resolution and update process, the processing of arrival messages M and effect on existing/new data instances d is depicted in FIG. 12. Extended definition (unmapped) fields have no bearing in the data resolution and update process. For simplicity, the case of detecting this field type is not depicted in the following. FIG. 12 shows the resolution and update process for data components 400 associated to the message instance m through mappings 800.

At step 1202 the metadata definition for the message instance m is obtained from the message component Ms, where the message instance m is related to the message component 404 at step 1204. In the case of a direct message mapping 801 at step 1206, the data component specification Ds is obtained 1208 from the mapping information. The primary key field of Ds is determined 1210 and the value to be applied to this field (m.f$_{pk}$) is obtained 1212 from the corresponding field of m. At step 1214 an existing version of the instance d is searched in the memory 210 (see FIG. 2). Using this value, the instance of Ds may either be found 1216 or created 1218, thus producing d. At step 1220 more fields of the data component Ds are determined. If yes, the data component definitions for the corresponding fields are analysed 1222 and the remaining field values of m are applied 1224 to each of the corresponding fields of the resolved, thus generating 1226 the updated/created data instance d.

At step 1228 in the case of field mappings 901, primary keys for each of the field mappings 901 are determined. The data component specification Ds is obtained 1230 from the mapping information 901. The resolution process relies on determining all field level mappings 901 from Ms that are mapped to data component primary fields: Ms.f$_{pki}$. The component data type of the field mapping 901 can be determined from Ms.f$_{pki}$ as Ds$_i$. Using 1232 the key value 802 from the input message m for this field (m.f$_{pki}$), the data instance of Ds$_i$ may be either found 1236 or created 1234, thus producing the data instance d$_i$ corresponding to Ds$_i$. The data instances d$_i$ are resolved and updated one at a time by selecting 1238 each field di.f$_n$ in sequence. The mapped message field Ms.f$_p$ is obtained 1240 and the corresponding mapped field definition Dsi.f$_n$ is obtained 1242. Remaining fields of Ms that are mapped 901 to fields of Ds$_i$ have their values taken from the message instance field m.f$_p$ and applied 1244 to d$_i$.f$_n$ using the corresponding field format of Ds$_i$; Ds$_i$.f$_n$. This process continues until all mapped data instances are updated, thus generating d at step 1226.

As stated previously, referring to FIG. 1, it may be desirable to associate a script or other executable unit (e.g. the workflow component 406)—see FIG. 4) to perform additional processing or transformations on the application 302 when the message 105 arrives. To this end, the message component definition 404 may specify the address of a custom processing unit (part of the framework 206) that will be invoked when a message 105 of this type is received. In addition to executing the script, the intelligent Device Runtime makes available the message 105 and all its field values to the scope of the processing unit. Further, all data instances d$_i$ affected through mappings 800 are made available to the scope of the processing unit.

Although the disclosure herein has been drawn to one or more exemplary systems and methods, many variations will be apparent to those knowledgeable in the field, and such variations are within the scope of the application. For example, although XML and a subset of ECMAScript are used in the examples provided, other languages and language variants may be used to define the component applications 302. Further, it is recognised as an alternative to the above described mapping 800 and operation 1100, 1200, the definition of the data fields 808 (see FIG. 8) could be contained in the message component 404 (see FIG. 4). Therefore, the generation of the message instance would be based on data field definitions included in the message component 404 definitions, and the data component 400 would be mapped 800 to the corresponding message component 404 having included data field definitions. Accordingly, generation of the data instances would rely upon data field definitions contained in the mapped message component 404.

The embodiments of the invention in which an exclusive property or privilege is claimed are defined as follows:

1. A method for populating a communication message instance in accordance with a component application executing on a device, the component application including at least one data component having at least one data field definition and at least one message component having at least one message field definition, the component definitions expressed in a structured definition language, the method comprising the steps of:
   determining that a message instance is to be generated and identifying a corresponding message component by a runtime environment, said corresponding message component comprising a mapping to a particular one or more of the at least one data field definitions, said mapping linking the definition of a particular message instance to the definition of a particular one or more data field instances in accordance with a mapping resolution contract resolved at runtime by the runtime environment operating on the message and data component definitions;
   identifying at least one unique mapping in the corresponding message component, each unique mapping identifying a particular data component as defined by a unique identifier representing the mapping in accordance with the mapping resolution contract;
   obtaining at least one data instance field value corresponding to the at least one data field of the mapped particular data component; and
   populating the at least one message field of the message instance with the at least one data instance field value.

2. The method according to claim 1, wherein a plurality of the data field definitions of the data component is shared between the at least one message component and the at least one data component as represented by the mapping.

3. The method according to claim 2 further comprising the step of linking the plurality of data field definitions to corresponding ones of the message fields as represented by the unique identifier.

4. The method according to claim 2 further comprising the step of identifying additional processing code coupled to the at least one message component for assisting in processing of the message instance.

5. The method according to claim 4, wherein the processing code specifies an address of a provisioning unit for handling the processing code.

6. The method according to claim 3 further comprising the step of identifying additional ones of the message field definitions in relation to the unique identifier.

7. The method according to claim 2, wherein the mapping is a field level mapping linking a first one of the message field definitions to a first one of the data field definitions and a second one of the message field definitions to a second one of the data field definitions.

8. The method according to claim 7, wherein the number of message field definitions of the message component is less that the number of data field definitions of the mapped data component.

9. The method according to claim 7, wherein the first message field definition is mapped by a first one of the unique identifiers to a first one of the data components and the second message field definition is mapped by a second one of the unique identifiers to a second one of the data components different from the first data component.

10. The method according to claim 7, wherein the first message field definition and the second message field definition are mapped to the same data component using the unique identifier.

11. The method according to claim 2, wherein the structured definition language is XML based.

12. The method according to claim 11, wherein the application is a wireless application and the device is a wireless device.

13. The method according to claim 2, wherein the unique identifier is a simple primary key.

14. The method according to claim 2, wherein the unique identifier is a composite key.

15. The method according to claim 2, wherein the message component defines a parent one of the message components coupled to a dependent one of the message components.

16. The method according to claim 15 further comprising the step of overriding one of the mappings of the parent message component by respective one of the mappings of the dependent message component.

17. A method for populating a data instance for a component application executing on a device based on a received message, the component application comprising at least one data component having at least one data field definition and at least one message component having at least one message field definition, the component definitions expressed in a structured definition language, the method comprising the steps of:
   receiving a message instance and identifying a corresponding message component by a runtime environment, said corresponding message component comprising a mapping to a particular one or more of the at least one data field definitions, said mapping linking the definition of the message instance to the definition of a particular one or more data field instances in accordance with a mapping resolution contract resolved at runtime by the runtime environment operating on the message and data component definitions;
   identifying at least one unique mapping in the corresponding message component, each unique mapping identifying a particular data component as defined by a unique identifier representing the mapping in accordance with the mapping a resolution contract;
   obtaining at least one message instance field value from the message instance corresponding to the at least one data field of the mapped data component; and
   populating the at least one data field of the data instance with the at least one message instance field value.

18. The method according to claim 17, wherein a plurality of the data field definitions of the data component is shared between the at least one message component and the at least one data component as represented by the mapping.

19. The method according to claim 18 further comprising the step of linking the plurality of data field definitions to corresponding ones of the message fields as represented by the unique identifier.

20. The method according to claim 18 further comprising the step of identifying additional processing code coupled to the at least one message component for assisting in processing of the message instance.

21. The method according to claim 20, wherein the processing code specifies an address of a provisioning unit for handling the processing code.

22. The method according to claim 19 further comprising the step of identifying additional ones of the message field definitions in relation to the unique identifier.

23. The method according to claim 18, wherein the mapping is a field level mapping linking a first one of the message field definitions to a first one of the data field definitions and a second one of the message field definitions to a second one of the data field definitions.

24. The method according to claim 23, wherein the number of message field definitions of the message component is less that the number of data field definitions of the mapped data component.

25. The method according to claim 23, wherein the first message field definition is mapped by a first one of the unique identifiers to a first one of the data components and the second message field definition is mapped by a second one of the unique identifiers to a second one of the data components different from the first data component.

26. The method according to claim 23, wherein the first message field definition and the second message field definition are mapped to the same data component using the unique identifier.

27. The method according to claim 18, wherein the structured definition language is XML based.

28. The method according to claim 27, wherein the application is a wireless application and the device is a wireless device.

29. The method according to claim 16, wherein the unique identifier is a simple primary key.

30. The method according to claim 18, wherein the unique identifier is a composite key.

31. The method according to claim 18, wherein the message component defines a parent one of the message components coupled to a dependent one of the message components.

32. The method according to claim 31 further comprising the step of overriding one of the mappings of the parent message component by respective one of the mappings of the dependent message component.

33. A method for populating a communication message instance in accordance with a component application executing on a device, the component application comprising at least one data component and at least one message component having at least one message field definition and at least one data field definition, the component definitions expressed in a structured definition language, the method comprising the steps of:
   determining that a message instance is to be generated and identifying a corresponding data component by a runtime environment, said corresponding data component comprising a mapping to a particular one or more of the at least one data field definitions, said mapping linking the definition of a particular data instance to the definition of a particular one or more data field instances of said at least one message component in accordance with a mapping resolution contract resolved at runtime by a runtime environment operating on the data and message component definitions;
   identifying at least one unique mapping in the corresponding data component, each unique mapping identifying a particular message component as defined by a unique identifier representing the mapping in accordance with the mapping resolution contract;
   obtaining at least one data instance field value corresponding to the at least one data field definition of the mapped message component;
   populating the at least one message field of the message instance with the at least one data instance field value.

34. A method for populating a data instance for a component application executing on a device based on a received message, the component application comprising at least one data component having at least one data field definition and at least one message component having at least one message field definition, the component definitions expressed in a structured definition language, the method comprising the steps of:
   receiving a message and identifying a corresponding message component by a runtime environment;
   identifying a corresponding data component providing a definition for the data instance to be populated by the runtime environment, said corresponding data component comprising a mapping to a particular one or more of the at least one message field definitions, said mapping linking the definition of a particular data instance to the definition of a particular one or more message field instances of said at least one message component in accordance with a mapping resolution contract resolved at runtime by a runtime environment operating on the data and message component definitions;
   identifying at least one unique mapping present in the corresponding data component, the mapping identifying the at least one message field in the corresponding message component as defined by a unique identifier representing the mapping in accordance with the mapping resolution contract;
   obtaining at least one message instance field value corresponding to the at least one message field of the mapped message component;
   populating the at least one data field of the data instance with the at least one message instance field value.

35. A device for populating communication message in accordance with a component application executing on the device, the component application comprising at least one data component having at least one data field definition and at least one message component having at least one message field definition, the component definitions expressed in a structured definition language, the device comprising:
   means for determining that a message instance is to be generated and identifying a corresponding message component, said corresponding message component comprising a mapping to a particular one or more of the at least one data field definitions, said mapping linking the definition of a particular message instance to the definition of a particular one or more data field instances in accordance with a mapping resolution contract resolved at runtime by means operating on the message and data component definitions;
   means for identifying at least one unique mapping in the corresponding message component, each unique mapping identifying a particular data component as defined by a unique identifier representing the mapping in accordance with the mapping resolution contract;
   means for obtaining at least one data instance field value corresponding to the at least one data field of the mapped particular data component; and
   means for populating the at least one message field of the message instance with the at least one data instance field value.

\* \* \* \* \*